US009935833B2

(12) United States Patent
McAllister

(10) Patent No.: US 9,935,833 B2
(45) Date of Patent: Apr. 3, 2018

(54) METHODS AND APPARATUS FOR DETERMINING AN OPTIMIZED WIRELESS INTERFACE INSTALLATION CONFIGURATION

(71) Applicant: Time Warner Cable Enterprises LLC, New York, NY (US)

(72) Inventor: Bryan McAllister, Charlotte, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 359 days.

(21) Appl. No.: 14/534,067

(22) Filed: Nov. 5, 2014

(65) Prior Publication Data

US 2016/0127185 A1    May 5, 2016

(51) Int. Cl.
| | |
|---|---|
| *H04W 4/00* | (2009.01) |
| *H04L 1/00* | (2006.01) |
| *G06Q 30/00* | (2012.01) |
| *H04L 12/24* | (2006.01) |
| *H04W 4/02* | (2018.01) |
| *H04W 24/02* | (2009.01) |

(Continued)

(52) U.S. Cl.
CPC .......... *H04L 41/0823* (2013.01); *H04W 4/02* (2013.01); *H04W 24/02* (2013.01); *G06Q 30/06* (2013.01); *H04W 84/12* (2013.01); *H04W 88/08* (2013.01)

(58) Field of Classification Search
CPC .... H04L 41/0823; H04W 4/02; H04W 24/02; H04W 84/12; H04W 88/08
See application file for complete search history.

(56) References Cited

U.S. PATENT DOCUMENTS

| | | |
|---|---|---|
| 5,313,454 A | 5/1994 | Bustini et al. |
| 5,369,707 A | 11/1994 | Follendore, III |

(Continued)

FOREIGN PATENT DOCUMENTS

| | | |
|---|---|---|
| EP | 1139198 A2 | 10/2001 |
| EP | 2113860 A1 | 11/2009 |

(Continued)

OTHER PUBLICATIONS

Miao, Distributed interference-aware energy-efficient power optimization, Apr. 2011, IEEE Transactions on Wireless Communications, vol. 10, No. 4, p. 1323-1333.*

(Continued)

*Primary Examiner* — Resha Desai
*Assistant Examiner* — Matthew Todd
(74) *Attorney, Agent, or Firm* — Gazdzinski & Associates, PC

(57) ABSTRACT

Methods and apparatus for determining a desired or optimal installation configuration for one or more wireless interface devices within a premises. In one embodiment, a network entity collects information relating to the type of services required and generates a customer profile. The customer profile is then used to determine a number and type of wireless interface devices required. In one variant, a device chart is given which lists a plurality of combinations of categories of service and a respective plurality of device combinations needed to provide optimal service thereto. The device chart is consulted to arrive at an appropriate installation order, which is submitted for premises installation.

20 Claims, 13 Drawing Sheets

(51) Int. Cl.
  *H04W 84/12* (2009.01)
  *G06Q 30/06* (2012.01)
  *H04W 88/08* (2009.01)

(56) References Cited

U.S. PATENT DOCUMENTS

| | | | |
|---|---|---|---|
| 5,528,284 A | 6/1996 | Iwami et al. |
| 5,577,209 A | 11/1996 | Boyle et al. |
| 5,708,961 A | 1/1998 | Hylton et al. |
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | Demello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van Rooyen et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rosetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |

(56) References Cited

U.S. PATENT DOCUMENTS

| | | |
|---|---|---|
| 7,567,565 B2 | 7/2009 | La Joie |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 * | 12/2010 | Kalika ............... H04N 21/4126 455/115.1 |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 * | 10/2011 | Mazur ................ H04L 41/0803 709/219 |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La Joie et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |

(56) References Cited

U.S. PATENT DOCUMENTS

| | | |
|---|---|---|
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La Joie |
| 2006/0171423 A1 | 8/2006 | Helms et al. |
| 2006/0179138 A1 | 8/2006 | Van Gassel et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1* | 9/2006 | Corley ............... H04L 63/0823 726/12 |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La Joie et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0025027 A1 | 1/2009 | Craner |
| 2009/0025075 A1 | 1/2009 | Chow et al. |
| 2009/0031371 A1 | 1/2009 | Munsell et al. |
| 2009/0064251 A1 | 3/2009 | Savoor et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0151006 A1 | 6/2009 | Saeki et al. |
| 2009/0170479 A1 | 7/2009 | Jarenskog |
| 2009/0182815 A1 | 7/2009 | Czechowski, III et al. |

(56) References Cited

U.S. PATENT DOCUMENTS

| | | |
|---|---|---|
| 2009/0185576 A1 | 7/2009 | Kisel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De Atley et al. |
| 2011/0252243 A1 | 10/2011 | Brouwer et al. |
| 2011/0286437 A1 | 11/2011 | Austin et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0222081 A1 | 8/2012 | Schaefer et al. |
| 2012/0291062 A1 | 11/2012 | Pearson et al. |
| 2012/0302259 A1 | 11/2012 | Busch |
| 2012/0330759 A1* | 12/2012 | Aggarwal ......... G06Q 30/0271 705/14.73 |
| 2013/0016648 A1 | 1/2013 | Koskela et al. |
| 2013/0045681 A1 | 2/2013 | Dua |
| 2013/0046623 A1* | 2/2013 | Moritz ................. G06Q 30/02 705/14.53 |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0235774 A1 | 9/2013 | Jo et al. |
| 2013/0254787 A1 | 9/2013 | Cox et al. |
| 2013/0308622 A1 | 11/2013 | Uhlik |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0215506 A1 | 7/2014 | Kalmes et al. |
| 2014/0242991 A1 | 8/2014 | Yanover et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106846 A1 | 4/2015 | Chen et al. |
| 2015/0146537 A1 | 5/2015 | Panaitopol et al. |
| 2015/0189377 A1 | 7/2015 | Wheatley et al. |
| 2015/0365833 A1 | 12/2015 | Stafford et al. |
| 2016/0019103 A1 | 1/2016 | Basra |
| 2016/0301525 A1 | 10/2016 | Canard et al. |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |

(56) References Cited

FOREIGN PATENT DOCUMENTS

| JP | 2012523614 A | 10/2012 |
|---|---|---|
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008080556 A1 | 7/2008 |
| WO | WO-2009020476 A2 | 2/2009 |
| WO | WO-2012021245 A1 | 2/2012 |

OTHER PUBLICATIONS

Gomez, Conserving transmission power in wireless ad hoc networks, 2001, Network Protocols.*

Deering S.E., "Internet Protocol, Version 6 (IPv6) Specification," 1998.

Internet Protocol DARPA Internet Program Protocol Spec, 1981.

5C Digital Transmission Content Protection White Paper, Hitachi, Ltd., et al., dated Jul. 14, 1998, 15 pages.

Cantor, et al., Assertions and Protocols for the OASIS Security Assertion Markup Language (SAML) V2.0, OASIS Standard, Mar. 15 2005. Document ID: saml-core-2.0-os (http://docs.oasis-open.org/securit/saml/v2.0/saml-core-2.0-os.pdf).

Cantor, et al., Bindings for the OASIS Security Assertion Markup Language (SAML) V2.0, OASIS Standard, Mar. 2005 (http://docs.oasis-open.org/security/saml/v2.0/).

Cisco Intelligent Network Architecture for Digital Video—SCTE Cable-Tec Expo 2004 information page, Orange County Convention Center, Jun. 2004, 24 pages.

DCAS Authorized Service Domain, Version 1.2, dated Nov. 30, 2005, 54 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

Griffith, et al.,Resource Planning and Bandwidth Allocation in Hybrid Fiber-Coax Residential Networks, National Institute of Standards and Technology (NIST), 10 pages, no date.

Gupta V., et al., "Bit-Stuffing in 802.11 Beacon Frame: Embedding Non-Standard Custom Information," International Journal of Computer Applications, Feb. 2013, vol. 63 (2), pp. 6-12.

High-bandwidth Digital Content Protection System, Revision 1.091, dated Apr. 22, 2003, Digital Content Protection LLC Draft, 78 pages.

Kanouff, Communications Technology: Next-Generation Bandwidth Management—The Evolution of the Anything-to-Anywhere Network, 8 pages, Apr. 1, 2004.

Marusic, et al., "Share it!—Content Transfer in Home-to-Home Networks." IEEE MELECON 2004, May 12-15, 2004, Dubrovnik, Croatia.

Media Server; 1 Device Template Version 1.01 Jun. 25, 2002.

Motorola DOCSIS Cable Module DCM 2000 specifications, 4 pages, no date.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP-HNEXT-I03-080418, 2005-2008.

OpenCable Host Device, Core Functional Requirements, OC-SP-HOST-CFR-I13-030707, Jul. 7, 2003.

OpenCable, HOST-POD Interface Specification, OC-SP-HOSTPOD-IF-113-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

Primergy BX300 Switch Blade user's manual, Fujitsu Corp., Sep. 30, 2002, first edition, pp. 1 to 20.

Real System Media Commerce Suite (Technical White Paper), at http://docs.real.com/docs/drm/DRM.sub-WP1.pdf, 12 pages, Nov. 2001.

Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Zhang, et al., A Flexible Content Protection System for Media-on-Demand, ISM China Research Lab, Proceedings of the IEEE Fourth International Symposium on Multimedia Software Engineering (MSE'02), 6 pages.

* cited by examiner

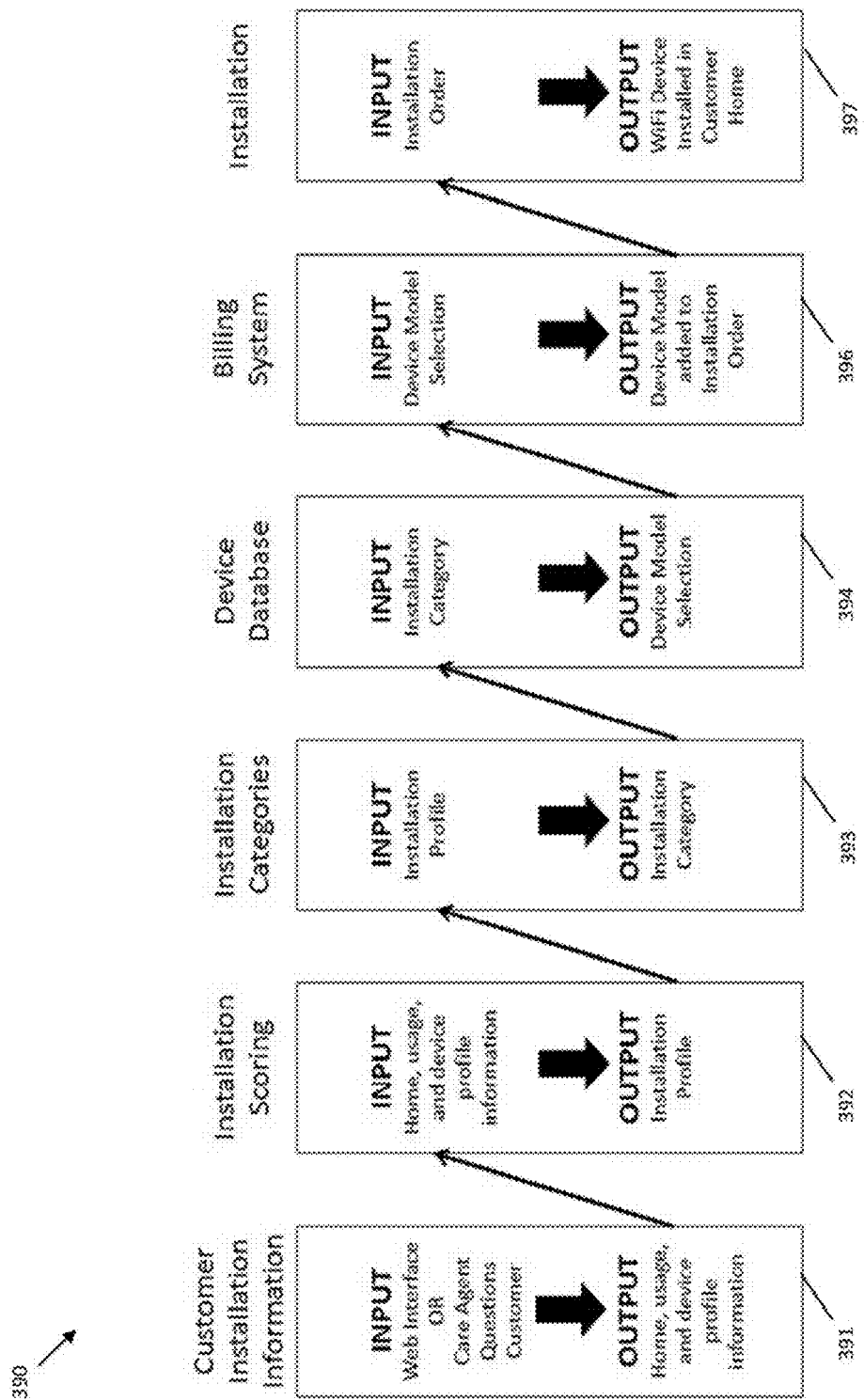

Home — 410

Home Question 1 — 411
What type of home do you live in?
- Apt. / Condo
- Single Family Home
- Townhouse / Duplex

Home Question 2 — 412
# of floors including the basement
- One
- Two
- Three
- More than three

Home Question 3 — 413
# of rooms incl. bathrooms, kitchen, etc.
- 1-3 rooms
- 4-8 rooms
- 9-12 rooms
- 13 or more rooms

Home Question 4 — 414
Aproximate square footage
- Under 1,000 sq.ft.
- From 1,000 sq.ft. to 2,000 sq.ft.
- From 2,000 sq.ft. to 3,000 sq.ft.
- Over 3,000 sq.ft.

Home Question 5 — 415
Outside construction?
- Aluminum siding
- Vinyl siding
- Brick
- Stone / Cement
- Wood / shingle

Home Question 6 — 416
Approximately when was your home built?
- Since the year 2000
- During the '80s or '90s
- During the '60s or '70s
- During the '40s or '50s
- Before 1940

Usage — 420

Usage Question 1 — 421
How many people in your household use wireless?
- 1-2
- 3-4
- 4 or more

Usage Question 2 — 422
What activities do you engage in when you use wireless?
- View news, shopping, check email
- Watch videos on a computer / tablet / phone
- Stream shows and movies to TV
- Stream music (Pandora, Slacker, iHeartRadio)
- Play online video games
- Work from home

Devices — 430

Device Question 1 — 431
Indicate the type and number of devices that use a wireless connection in your home

| Type | No. |
|---|---|
| Laptops / Tablets | |
| Cell Phones | |
| Smart TV | |
| TV Streaming (Apple TV, Roku, Amazon FireTV, etc.) | |
| eReaders (Kindle, etc.) | |
| Computer printers | |
| Thermostat, internet radio device, etc. | |

1. Select the option that best describes your home:
   ○ Apartment  ○ Townhome  ○ Single Family Home

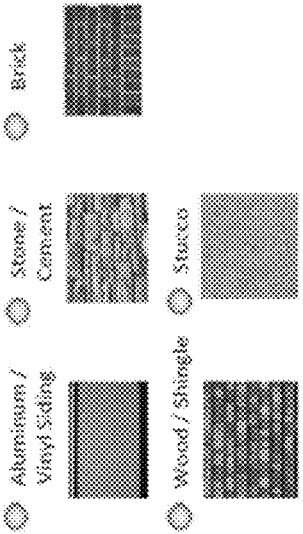

2. How many floors does your home have?
   ○ One
   ○ Two
   ○ Three
   ○ Four

3. How many rooms (including bathrooms and kitchen) does your home have?
   ○ 1 – 3
   ○ 4 – 8
   ○ 9 – 12
   ○ 13 or more 4. Approximately how many square feet is your home?
   ○ Under 1,000 sq.ft.
   ○ From 1,000 to 2,000 sq.ft.
   ○ From 2,000 to 3,000 sq. ft.
   ○ Over 3,000 sq.ft.

5. What is the outside of your home made of?
   (Click on picture to enlarge)
   ○ Aluminum / Vinyl Siding   ○ Stone / Cement   ○ Brick
   ○ Wood / Shingle   ○ Stucco

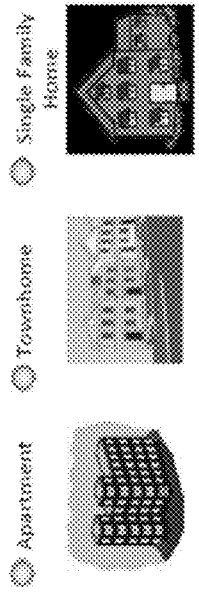

6. About when was your home built?
   ○ Since the year 2000
   ○ During the '80s or '90s
   ○ During the '60s or '70s
   ○ During the '40s or '50s
   ○ Before 1940

7. How many people in your household use wireless?
   ○ 1 – 2
   ○ 3 – 4
   ○ 5 or more

FIG. 4b

Home Question 1

| Type of home | Yes | Weight | Score |
|---|---|---|---|
| Apt. / Condo | | 1.5 | 0 |
| Single Family Home | | 1 | 0 |
| Townhouse / Duplex | X | 1.5 | 1.5 |
| | | Subtotal: | 1.5 |

511

Home Question 2

| # of floors | Yes | Category |
|---|---|---|
| One | | A |
| Two | | B |
| Three | | C |
| More than three | X | D |
| | Category: | D |

521

Home Question 3

| # of rooms | Yes | Weight | Score |
|---|---|---|---|
| 1-3 rooms | | 1 | 0 |
| 4-8 rooms | | 2 | 0 |
| 9-12 rooms | | 3 | 0 |
| 13 or more rooms | X | 4 | 4 |
| | | Subtotal: | 4 |

531

Home Question 4

| Square footage | Yes | Weight | Category |
|---|---|---|---|
| Under 1,000 sq.ft. | | 1 | W |
| From 1,000 sq.ft. to 2,000 sq.ft. | | 2 | X |
| From 2,000 sq.ft. to 3,000 sq.ft. | | 3 | Y |
| Over 3,000 sq.ft. | X | 4 | Z |
| | | Category: | Z |

541

Home Question 5

| Construction | Yes | Weight | Score |
|---|---|---|---|
| Aluminum siding | | 1.5 | 0 |
| Vinyl siding | | 1 | 0 |
| Brick | | 2 | 0 |
| Stone / Cement | X | 2 | 2 |
| Wood / Shingle | | 1 | 0 |
| | | Subtotal: | 2 |

551

Home Question 6

| Year built | Yes | Weight | Score |
|---|---|---|---|
| Since the year 2000 | | 1 | 0 |
| During the '80s or '90s | | 1 | 0 |
| During the '60s or '70s | | 2 | 0 |
| During the '40s or '50s | | 2 | 0 |
| Before 1940 | X | 3 | 3 |
| | | Subtotal: | 3 |

561, 570

Usage Question 1

| # of users | Yes | Weight | Score |
|---|---|---|---|
| 1-2 | | 1 | 0 |
| 3-4 | | 2 | 0 |
| 4 or more | X | 3 | 3 |
| | | Subtotal: | 3 |

571, 580

Usage Question 2

| Wireless usage | Yes | Weight | Score |
|---|---|---|---|
| View news, shopping, check email | X | 1 | 1 |
| Videos on a computer / tablet / phone | X | 3 | 3 |
| Stream shows and movies to TV | X | 4 | 4 |
| Stream music | X | 1 | 1 |
| Play online video games | X | 5 | 5 |
| Work from home | X | 2 | 2 |
| | | Subtotal: | 16 |

581, 590

Devices Question

| Devices in the home | Yes | Wght. | No. | Score |
|---|---|---|---|---|
| Laptops / Tablets | X | 1 | 5 | 5 |
| Cell Phones | X | 1 | 5 | 5 |
| Smart TV | X | 2 | 3 | 6 |
| TV Streaming | X | 2 | 3 | 6 |
| eReaders | X | 1 | 5 | 5 |
| Computer printers | X | 3 | 1 | 3 |
| Thermostat, internet radio devices, etc. | X | 1 | 2 | 2 |
| | | | Subtotal: | 32 |

591

Score: 61.5
Category: DZ

| SCORE --> | | 9 – 20 | 21 – 40 | 41 – 60 | 61 – 80 | 81+ |
|---|---|---|---|---|---|---|
| C A T E G O R Y | AW | DEVICE 1 | DEVICE 1 | DEVICE 2 | DEVICE 2 | DEVICE 2 |
| | AX | DEVICE 1 | DEVICE 1 | DEVICE 2 | DEVICE 2 | DEVICE 2 |
| | AY | DEVICE 2 | DEVICE 2 | DEVICE 2 | DEVICE 2 | DEVICE 2 |
| | AZ | DEVICE 2 | DEVICE 2 | DEVICE 2 + REPEATER | DEVICE 2 + REPEATER | DEVICE 2 + REPEATER |
| | BW | DEVICE 1 | DEVICE 1 | DEVICE 2 | DEVICE 2 | DEVICE 2 |
| | BX | DEVICE 1 | DEVICE 1 | DEVICE 2 | DEVICE 2 | DEVICE 2 |
| | BY | DEVICE 2 | DEVICE 2 | DEVICE 2 | DEVICE 2 | DEVICE 2 |
| | BZ | DEVICE 2 | DEVICE 2 | DEVICE 2 + REPEATER | DEVICE 2 + REPEATER | DEVICE 2 + REPEATER |
| | CW | DEVICE 1.5 + REPEATER | DEVICE 1.5 + REPEATER | DEVICE 2 + REPEATER | DEVICE 2 + REPEATER | DEVICE 2 + REPEATER |
| | CX | DEVICE 1.5 + REPEATER | DEVICE 1.5 + REPEATER | DEVICE 2 + REPEATER | DEVICE 2 + REPEATER | DEVICE 2 + REPEATER |
| | CY | DEVICE 2.0 + REPEATER | DEVICE 2.0 + REPEATER | DEVICE 2 + REPEATER | DEVICE 2 + REPEATER | DEVICE 2 + REPEATER |
| | CZ | DEVICE 2.0 + REPEATER | DEVICE 2.0 + REPEATER | DEVICE 2 + REPEATER | DEVICE 2 + REPEATER | DEVICE 2 + REPEATER |
| | DW | DEVICE 1.5 + REPEATER | DEVICE 1.5 + REPEATER | DEVICE 2 + REPEATER | DEVICE 2 + REPEATER | DEVICE 2 + REPEATER |
| | DX | DEVICE 1.5 + REPEATER | DEVICE 1.5 + REPEATER | DEVICE 2 + REPEATER | DEVICE 2 + REPEATER | DEVICE 2 + REPEATER |
| | DY | DEVICE 2.0 + REPEATER | DEVICE 2.0 + REPEATER | 2 DEVICE 2 + REPEATER | 2 DEVICE 2 + REPEATER | 2 DEVICE 2 + REPEATER |
| | DZ | DEVICE 2.0 + REPEATER | DEVICE 2.0 + REPEATER | 2 DEVICE 2 + REPEATER | 2 DEVICE 2 + REPEATER | 2 DEVICE 2 + REPEATER |

FIG. 6

METHODS AND APPARATUS FOR DETERMINING AN OPTIMIZED WIRELESS INTERFACE INSTALLATION CONFIGURATION

RELATED APPLICATIONS

The present application is related to co-owned U.S. patent application Ser. No. 14/511,079 filed on Oct. 9, 2014, entitled "APPARATUS AND METHODS FOR ENABLING LOCATION-BASED SERVICES WITHIN A PREMISES", and issued as U.S. Pat. No. 9,788,149 on Oct. 10, 2017; and to co-owned and co-pending U.S. patent application Ser. No. 14/302,313 filed on Jun. 11, 2014 and entitled "METHODS AND APPARATUS FOR ACCESS POINT LOCATION", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data and content distribution and delivery. In one exemplary aspect, the disclosure relates to determining a desirable or optimal access point or other wireless interface configuration within a premises, including a number and type of wireless interface devices and an optimal positioning thereof within the premises.

2. Description of Related Technology

Extant wireless installations generally rely on a manual means of determining an optimized location for positioning a wireless interface (e.g., an access point (AP), wireless access point (WAP), router, etc.) within a premises. As is well known, a wireless interface enables multiple wireless-enabled user or client devices in various locations within range of the wireless interface to communicate effectively simultaneously over a given air interface (e.g., Wi-Fi under IEEE Std. 802.11x). The optimal location of the wireless interface is sometimes a three-dimensional spatial problem, as client devices that will communicate with the wireless interface may be located on the same floor of a building or structure in any direction, and also on different floors above and below the wireless interface's position. In addition, at any of the locations where a client device is located, other local factors affecting the device's ability to communicate with the wireless interface may also exist, such as radio frequency (RF) signal path loss/attenuation (such as due to interposed materials), signal reflections, fading, localized "shading" and interference from other RF or electromagnetic sources.

Additionally, the characteristics of a wireless interface and the client devices are such that they may have directional RF properties due to, e.g., variances in antenna gain in different directions.

Furthermore, the construction of buildings has an effect on determining an optimal location; for example, construction involves the use of different materials that have different attenuation properties at exemplary radio frequencies used in wireless systems (e.g., 2.4 GHz, 3.6 GHz and 5 GHz), such as concrete, brick, dry-wall, wood, glass, metal framing, etc. Also, signals at these frequencies create multi-path propagation throughout the building, especially at increasing distances from the wireless interface, and can be quite unpredictable. Thus, all the client device locations are individually different in terms of the propagation path to and from the wireless interface.

Currently, even the most advanced tools rely on a technician who is installing and/or a user placing the wireless interface at a 'best guess' position, then making measurements throughout the structure to verify that the entire structure (or at least the portions of greatest importance to the user) is covered adequately in terms of signal strength. Usually the first location that the user or technician places the wireless interface is not optimal, or worse, the user/technician does not have enough information about the system's wireless link performance to make a proper adjustment to the initial location, and hence must make an "educated guess" as to what location might be better. This positioning process is iterative, in that the technician will need to make several measurements, then move the wireless interface to another location to improve on the last set of results, until the links to all of the client devices within the building are deemed sufficient for the final application (streaming video, internet browsing, etc.).

In the event that all "critical" locations/applications cannot be serviced with adequate signal, a second wireless interface may even be required, thereby further complicating the installation, and in some cases necessitating hand-offs between one wireless interface and the another when, e.g., a user moves from one location to the other during use.

Therefore, what are needed are improved apparatus and methods for enabling positioning of a wireless interface for optimal connectivity to all of the client devices within a premises, taking into account RF signal path loss/attenuation, signal reflections, fading, localized shading, and interference. Such improved wireless interface location identification methods and apparatus would ideally be provided across multiple client devices within a premises, and would be implemented using mechanisms readily available to a user, thereby obviating use of a specialist or technician.

SUMMARY

The present disclosure addresses the foregoing needs by providing, in various embodiments, methods and apparatus for determining a optimal installation configuration for one or more wireless interfaces within a premises.

In a first aspect, a method for determining a desired installation configuration for one or more client devices within a user's premises is disclosed. In one embodiment, the method includes receiving a request for services from the one or more client devices; providing a plurality of questions to the one or more client devices; receiving responses based on the plurality of questions; determining an optimal configuration, based on the responses; the optimal configuration including at least one or more identifying information; and transmitting the one or more identifying information to an entity.

In a second aspect, an apparatus configured to determine a desired installation configuration within a user's premises is disclosed. In one embodiment, the apparatus includes a first interface configured to communicate with a network; a storage apparatus; and a processor configured to execute at least one computer program, the at least one computer program comprising a plurality of instructions which are configured to, when executed: (i) receive a request for services from at least one of a plurality of client devices; (ii) provide the at least one of the plurality of client devices a plurality of questions; (iii) receive a plurality of responses based on the plurality of questions; (iv) evaluate the plurality of responses to determine an optimal configuration for the user's premises; and (v) transmit the optimal configuration to an entity.

In a third aspect, a method for determining a desired installation configuration within a user's premises is disclosed. In one embodiment, the method includes receiving a request for services from at least one of a plurality of client devices; providing the at least one of the plurality of client devices a plurality of questions; receiving a plurality of responses based on the plurality of questions; calculating an installation score based on the plurality of responses; evaluating the installation score to determine an optimal configuration for the user's premises; and transmitting the optimal configuration to an entity.

In a fourth aspect, a computer readable apparatus comprising at least one computer program is disclosed. In one embodiment, the computer program comprises a plurality of instructions which are configured to, when executed, receive a request for services from one or more client devices; provide a plurality of questions to the one or more client devices; receive responses based on the plurality of questions; determine an optimal configuration, based on the responses; the optimal configuration including at least one or more identifying information; and transmit the one or more identifying information to an entity.

In a fifth aspect, an apparatus configured to determine a desired installation configuration for one or more client devices within a user's premises is disclosed. In one embodiment, the apparatus includes a first interface configured to communicate with a network; a storage apparatus; and a processor configured to execute at least one computer program, the at least one computer program comprising a plurality of instructions which are configured to, when executed: (i) receive a request for services from one or more client devices; (ii) provide a plurality of questions to the one or more client devices; (iii) receive responses based on the plurality of questions; (iv) determine an optimal configuration, based on the responses; (v) the optimal configuration including at least one or more identifying information; and (vi) transmit the one or more identifying information to an entity.

In a sixth aspect, an apparatus configured to determine a desired installation configuration within a user's premises is disclosed. In one embodiment, the apparatus includes a first interface configured to communicate with a network; a storage apparatus; and a processor configured to execute at least one computer program, the at least one computer program comprising a plurality of instructions which are configured to, when executed: (i) receive a request for services from at least one of a plurality of client devices; (ii) provide the at least one of the plurality of client devices a plurality of questions; (iii) receive a plurality of responses based on the plurality of questions; (iv) calculate an installation score based on the plurality of responses; (v) evaluate the installation score to determine an optimal configuration for the user's premises; and (vi) transmit the optimal configuration to an entity.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 3c is a logical flow diagram illustrating a specific variant of an exemplary input/output process for determining an optimal installation configuration for wireless interface devices according to the present disclosure.

FIG. 4a is an illustration of an exemplary registration questionnaire interface according to the present disclosure.

FIG. 4b is an illustration of another exemplary registration questionnaire interface according to the present disclosure.

FIG. 5 is an illustration of an exemplary interface for calculating a consumer profile according to the present disclosure.

FIG. 6 is an illustration of an exemplary device chart for determining an optimal installation configuration for wireless interface devices according to the present disclosure.

Figure 1:
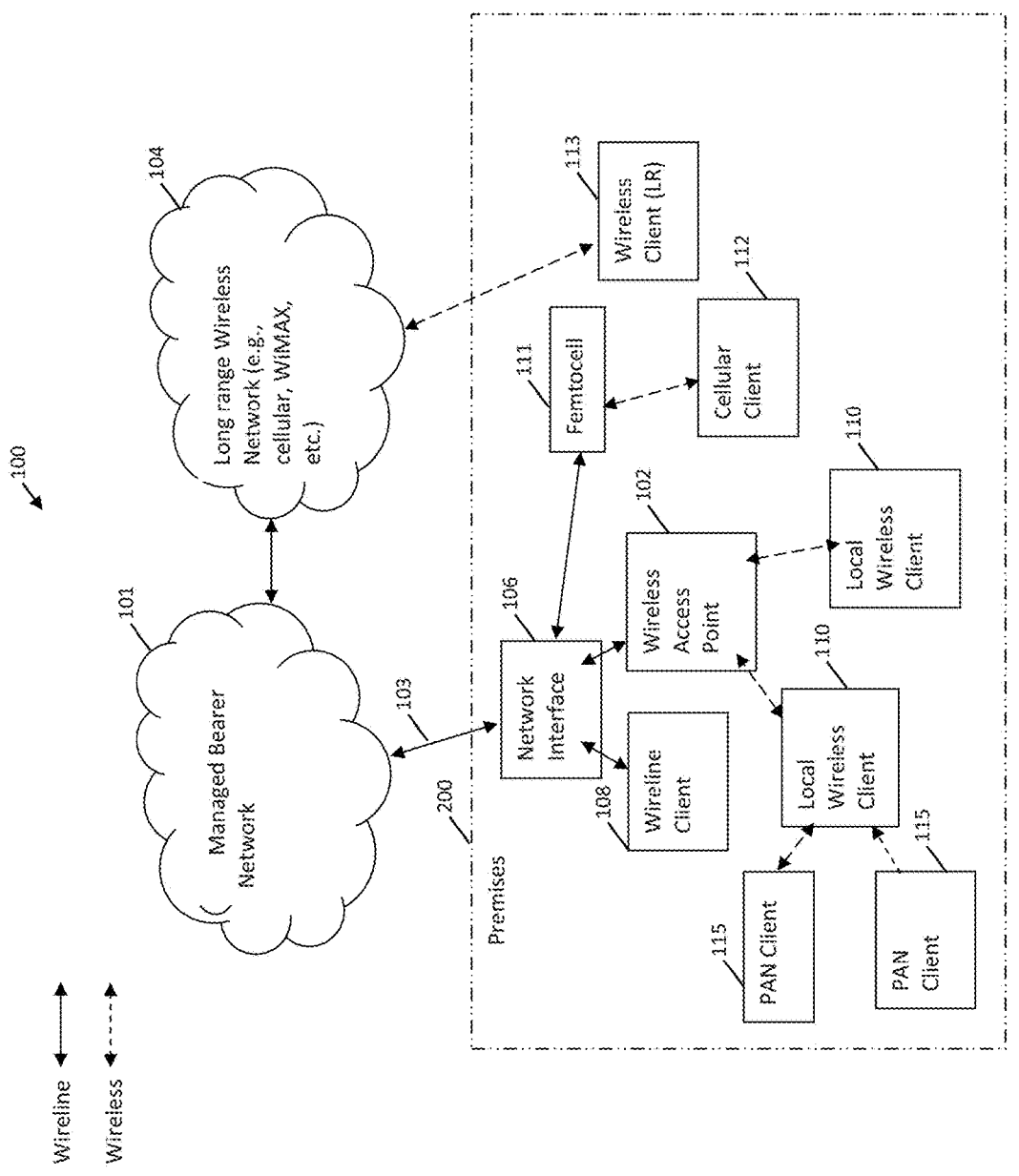
FIG. 1 is a functional block diagram illustrating an exemplary network architecture for providing broadband and other services to a premises.

All Figures © Copyright 2014 Time Warner Cable Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "computer program" or "software" is meant to include any sequence or human or machine cognizable steps that perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "consumer device" refer without limitation to any type of electronic equipment located within a consumer's or user's premises and connected to a network. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0 (and beyond).

As used herein, the term "gateway" includes, without limitation, devices configured to interface with a network, and pass signals to or exchange signals with, another device in communication therewith.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form, which is adapted to provide data, files, applications, content, or other services to one or more other devices or entities on a computer system or network.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

The present disclosure provides, inter alia, methods and apparatus for determining a desired installation configuration for one or more client devices within a user's premises. In one embodiment, a registration application receives a request for services from a user via a client device. The request is made by the user when creating an account and logging in to the registration application. The registration application then provides the user with a plurality of questions. The questions inquire about the user's premises. In one variant, the questions my further inquire about the user's intended usage of the requested service and about the type and number of client devices used in the premises as well as the type of usage for each of the client devices. The registration application receives the user's responses to the questionnaire and determines the optimal configuration, i.e., the number and type of wireless interface devices needed to fulfill the service request. In one embodiment, this is determined based on the given information and comparing the given information to a device chart. The identified wireless interface device information is then transmitted to a distribution/installation hub where a technician receives the information and installs the identified wireless interface device at the user's premises.

The foregoing exemplary embodiment of the methodology in effect turns the prior art paradigm "on its head", in that inter alia, one or more of the questions are leveraged for better granularity, thereby allowing for a much more efficient way to determine the most optimal wireless interface device configuration of a given space/structure than under the prior art approach of either installing high performing wireless interface device when not necessary or installing low performing wireless interface devices when inadequate.

Methods of operating the network(s), client devices, and business models using the network and techniques referenced above, are also described.

The various aspects of the present disclosure may be useful in, inter alia, 802.11b/g/n/ac systems involving a single access point (or even multiple access points) and one or more client devices, such as a residential Wi-Fi installation. For example, the various aspects disclosed herein are useful to cable service companies, Telco, and other high-speed data (HSD) service providers and Video-over Wi-Fi (VoW) service installations.

Detailed Description Of Exemplary Embodiments

Exemplary embodiments of the apparatus and methods of the disclosure are now described in detail. While these exemplary embodiments are described in the context of the aforementioned hybrid fiber coax (HFC) cable system architecture having a multiple systems operator (MSO), digital networking capability, IP delivery capability, and plurality of client devices/CPE, the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network-side Architecture—

FIG. 1 illustrates a typical network configuration with which the exemplary apparatus and methods of the present disclosure may be used. The various components of the network configuration 100 include (i) a bearer network 101, typically a managed network such as an HFC (hybrid fiber coax) cable network, satellite network, fiber-based network such FTTH or FTTC, hybrid fiber-copper (HFCu) network, etc., as well as unmanaged networks such as internets (e.g., the Internet); (ii) a premises 200 (described in greater detail subsequently herein); (iii) a long-range wireless network (e.g., a cellular or WiMAX network) 104 servicing mobile users 112, 113 either directly, or indirectly via a femtocell 111 or the like; (iv) a network interface 106 (including e.g., a modem for communication with the bearer network medium 103, such as QAM modulated RF carriers, DSL signals (e.g., above 20 KHz), T1, optical carriers, and the like) which communicates with the bearer network 101; a wireless (local) access point 102, typically in wireline communication with the network interface 106; (v) a wireline client 108, such as a PC, smart TV, gateway, etc. in wireline communication with the network interface 106; (vi) one or more local wireless clients (e.g., tablets, smartphones, laptops, etc.) 110 in wireless communication with the access point 102; and (vi) one or more PAN (personal area network) clients such as a wireless keyboard, mouse, etc. 115 in wireless communication with the wireless client 110 (or the long-range wireless clients 112, 113). It will be appreciated that the configuration 100 of FIG. 1 is purely for purposes of illustration, and may take on literally a limitless number of other configurations consistent with the present disclosure.

As noted above, exemplary bearer networks 101 useful with the present disclosure include any form of managed or unmanaged networks, such as e.g., those described in co-owned U.S. Pat. No. 8,713,623, entitled "TECHNIQUE FOR EFFECTIVELY PROVIDING PROGRAM MATERIAL IN A CABLE TELEVISION SYSTEM", issued on Apr. 29, 2014 and incorporated herein by reference in its entirety (describing one exemplary broadcast switched digital architecture); co-owned U.S. Patent Application Publication No. 2012/0023535 entitled "APPARATUS AND METHODS FOR PACKETIZED CONTENT DELIVERY OVER A BANDWIDTH-EFFICIENT NETWORK", filed on Jul. 22, 2010, and issued as U.S Pat. No. 8,997,136 on Mar. 31, 2015, which is incorporated herein by reference in its entirety (describing delivery of packetized content via a bandwidth-optimized network); and co-owned, co-pending U.S. Patent Application Publication No. 2011/0103374 filed on Apr. 21, 2010, and entitled "METHODS AND APPARATUS FOR PACKETIZED CONTENT DELIVERY OVER A CONTENT DELIVERY NETWORK", incorporated herein by reference in its entirety (describing inter alia, a 3GPP IMS (IP Multimedia Subsystem) network with common control plane and service delivery platform (SDP)). It will be appreciated that the methods and apparatus of the present disclosure advantageously are effectively agnostic to the bearer network architecture, thereby providing a large degree of applicability in various user/subscriber applications.

Exemplary Premises Network Architecture—

Figure 2A:
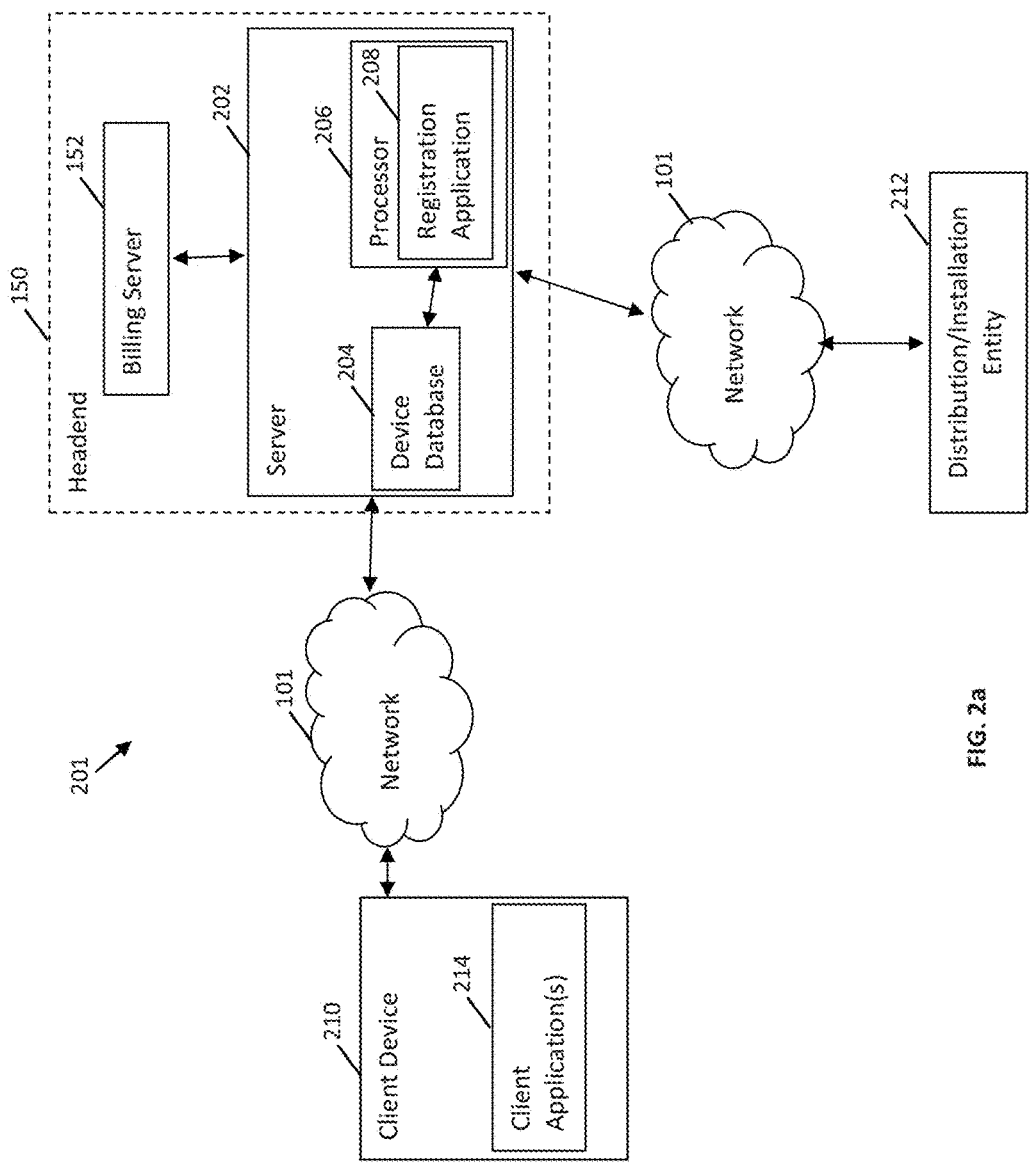
FIG. 2a is a functional block diagram illustrating one exemplary embodiment of a premises wireless interface device network architecture for determining an optimal installation configuration for wireless interface devices in accordance with the present disclosure.
Figure 2B:
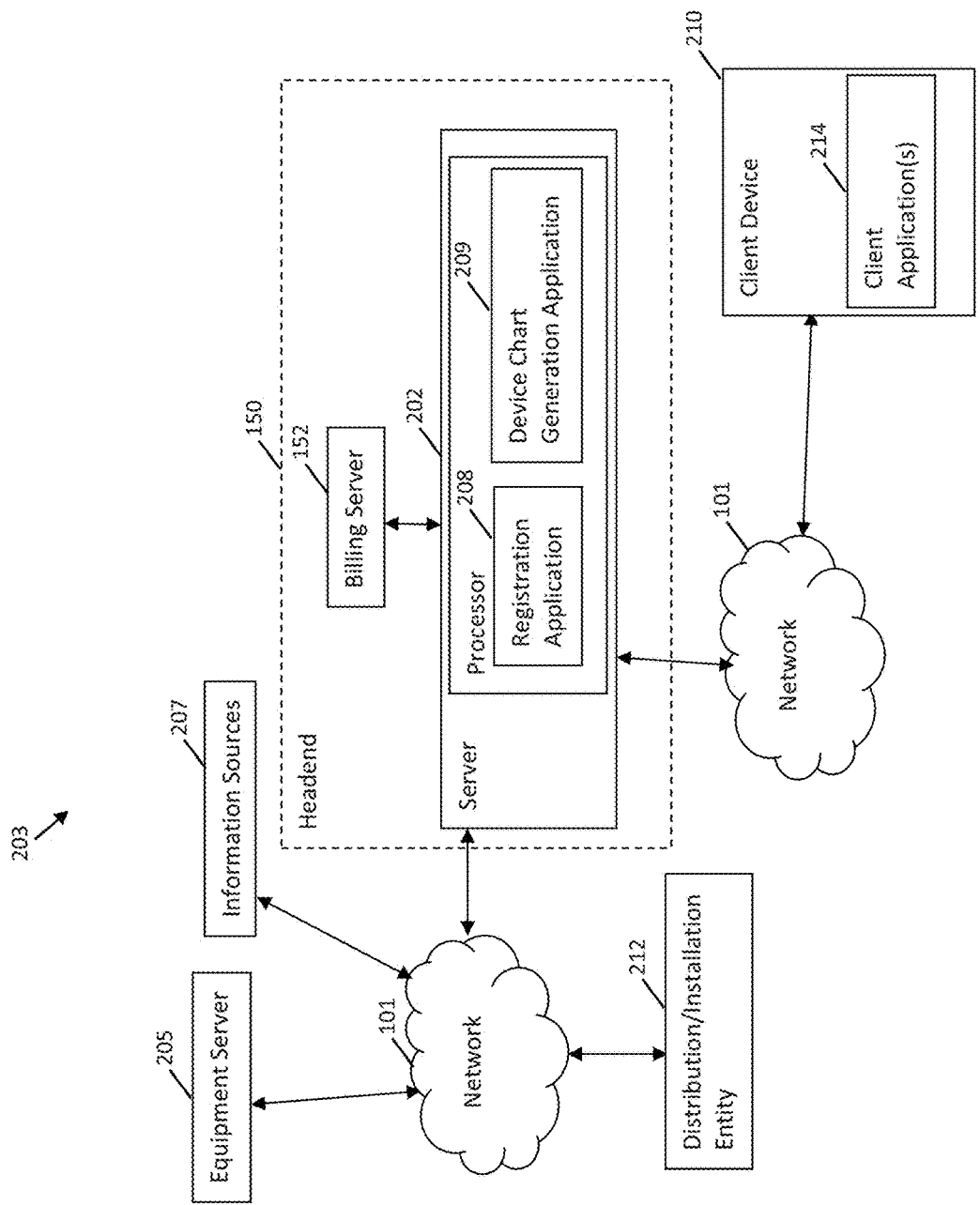
FIG. 2b is a functional block diagram illustrating another exemplary embodiment of a premises wireless interface device network architecture for determining an optimal installation configuration for wireless interface devices in accordance with the present disclosure.

Referring now to FIGS. 2a and 2b, exemplary embodiments of a premises wireless interface device network architecture 201 for determining a desired or optimal wireless interface device installation configuration according to the present disclosure are illustrated. It will be appreciated that the premises wireless interface device network architecture 201 of FIGS. 2a and 2b can be used in conjunction with any of the foregoing network content distribution architectures (including e.g., those of FIG. 1 discussed supra). Although not illustrated, it is appreciated that once the optimized installation configuration is determined, the wireless access point 102 may be installed thereat and placed as a communication proxy between the client device 210 and the network 101 (as discussed above with respect to FIG. 1).

As discussed elsewhere herein, the access point device 102 communicates with the content delivery network 101, as well as to each of the client devices 210 in a premises. It is further appreciated that the access point device 102 and/or the client devices 210 may communicate with other networks including e.g., an internet (such as the Internet 111), long-range (e.g., cellular or WiMAX) wireless networks, satellite networks, mesh networks, etc. An exemplary access point or wireless interface device 102 is described in co-owned, co-pending U.S. patent application Ser. No. 14/302,313 filed on Jun. 11, 2014 and entitled "METHODS AND APPARATUS FOR ACCESS POINT LOCATION", which was previously incorporated herein by reference in its entirety.

It is further noted that the client devices 210 of FIGS. 2a-2b are intended to refer collectively to all devices (whether mobile or fixed) which may access the network 101 via the wireless interface 102 (such as e.g., the local wireless client 110, PAN client 115, wireline client 108, and cellular client 112 of FIG. 1) as well as individually to the device which is utilized to initiate the configuration optimization discussed herein.

It will be appreciated that as used herein, the terms "desired", "optimal", and/or "best" are used herein without limitation to refer to a wireless interface device, installation, configuration, and/or condition which is desirable or useful, whether or not fully optimized with respect to all parameters under consideration (e.g., all signal strengths device range, speed, bandwidth, and/or performance). For instance, it may be that there is no truly "optimal" wireless interface device for a given premises; i.e., the user may have to sacrifice performance, convenience, and/or other considerations based on the particular attributes of the installation. In such an instance, the use of these terms is intended to indicate a relative state of the device, installation, configuration and/or condition with respect to any other possibilities presented.

It is also appreciated that terms such as "optimal", "best" etc. as used herein are intended to express a relative value, and may be based on any number of considerations which may or may not relate to performance of a wireless interface device, service, link, or similar functionality. For example, a "best" position for a wireless interface device for a given user may be one which maximizes both link performance and ergonomics/utility/aesthetics for the user. A user may, for example, sacrifice some level of link performance to have the wireless interface device placed in a location which is not inconvenient or an eyesore; i.e., it is not the "best" with respect to RF parameters/link quality, but is the best optimization of multiple considerations.

As illustrated in FIG. 2a, the premises wireless interface device network architecture 201 generally comprises the client device 210, a distribution/installation hub 212 and a headend architecture 150 (such as that described in previously incorporated U.S. patent application Ser. No. 14/511, 079).

As illustrated, the headend architecture 150 comprises many components and services including e.g., a billing module 152 and a server 202. As illustrated, the server 202 may comprise a device database 204 and a processor 206, which is configured to at least execute a registration application 208. The server 202 will be discussed in greater detail elsewhere herein.

In the illustrated embodiment, the client device 210 of the premises wireless interface device network 201 comprises one or more mobile devices (i.e., devices which may move within a premises and beyond, such as a smart phone, tablet, or laptop) as well as fixed devices (i.e., devices which are associated to a single, static location, such as a set-top-box or PC). Although illustrated as a single device for clarity in FIG. 2a, it is appreciated that one or more devices 210 may be in communication with the headend 150 via the network 101 (as discussed above).

The client device 210 is in one variant configured to allow a user to download one or more client registration applications 214 thereto which enable the client to begin the process for optimizing the wireless interface 102 installation configuration. Additional mechanisms for placing a given client application 214 on the client device 210 may also be utilized consistent with the present disclosure, including e.g., having the one or more client applications 214 pre-positioned on the device 210 at the time of manufacture or provisioning (e.g., by a wireless carrier when the mobile device/subscription is purchased), via "hard" media such as a CD-ROM, flash drive, or via download from a third-party provider via the Internet (such as from a so-called "App store" or "App-store").

In another variant, the process for optimizing the wireless interface 102 installation configuration occurs via a communication between the client device 210 and a webpage or an operator (e.g., upon placing a phone call thereto either via the client device 210 or other telephone device). According to this embodiment, no client application 214 is utilized on the client device 210.

In one embodiment, after the one or more installation configuration optimization applications 214 have been downloaded or otherwise accessed, the user of the client device 210 uses a profile application thereof to answer a variety of questions aimed at ensuring optimal installation. In one embodiment, the questions may comprise asking for description information about the user's residence, wireless usage, and the types and number of devices that are intended to use a wireless connection in the user's premises (as discussed subsequently herein).

The answers to the questions are provided to a headend server 202 for processing thereat by a registration application 208. The user's responses to the questions in the profile application allow the server 202 (via the server-side registration application 208) to have better granularity when determining the most optimal wireless interface device configuration for the user's premises. Specifically, the optimization process can better balance the various competing considerations and trade-offs by virtue of knowing what the relative importance of each is, and its magnitude or scale.

As discussed elsewhere herein, the results determined from the questionnaire are processed by the registration application 208. Specifically, the registration application 208 weighs the answer to each question to arrive at a score for the requested service. The derived score is then compared to a device chart stored at the device database 204 also stored at the server 202. As discussed elsewhere herein, the device chart comprises an optimal device configuration for each derived score. The device chart is, in the embodiment of FIG. 2a, pre-generated and simply stored at the device database 204 (with appropriate updates being provided as needed). The device chart may be generated and provided to the server 202 from e.g., a third party (i.e., non-network 101) entity. An exemplary device chart is illustrated and discussed elsewhere herein. The device chart identifies an optimal configuration, which is then communicated to a distribution/installation entity 212 as well as a billing entity 152.

The communication from the registration application 208 to the distribution/installation entity 212 may include, simply, an identification of the number and type (or types) of wireless interface devices 102 which will be required when service is installed at the user's premises. An order or ticket for the wireless interface device(s) 102 may then be utilized when stocking a technician's truck; or, alternatively, may be used to ship the appropriate devices to the subscriber.

In the event that the user is a new subscriber (or is setting up a new account), the billing entity 152 also receives the determined configuration information from the registration application 208. According to this embodiment, the billing entity 152 uses the determined number and type of wireless interface devices to supplement other billing data when determining a subscription cost. In the event that the user is not starting a new account, the billing entity 152 may instead be utilized to provide information to the registration application 208 for processing alongside user provided information. In one embodiment, the billing entity 152 provides the appropriate devices 102 the user currently or previously used at the user's premises to the registration application 208 for processing alongside user provided information to determine the appropriate number and type of wireless interface devices to be used at the user's premise. In one variant, the billing entity 152 also provides the results determined from a previous questionnaire to the registration application 208 for processing alongside user provided information to determine the appropriate number and type of wireless interface devices to be used at the user's premise. In another specific example, a customer who has previously used the herein-described process when initially getting wireless service decides to subsequently upgrade/modify their service selection. For example, a new product is released which is essentially one box that serves as the DVR, wireless gateway, cable box, etc. This one box wirelessly delivers all content—including video to IP set-top boxes—as well as serve as the wireless access point (102 of FIG. 1). In this case, the same input information previously entered for regular wireless internet is used to specify this box and other ancillary amplification equipment such as a wireless repeater.

Referring now to FIG. 2b, another exemplary network configuration 203 for determining an optimized wireless interface configuration is illustrated. The apparatus disclosed in FIG. 2b function substantially similarly to those previously described with respect to FIG. 2aHowever, as illustrated the network 203 of FIG. 2b, does not include a device database 204 for storing the device chart.

Rather, in the embodiment of FIG. 2b, a device chart generation application 209 at the server 202 consults a plurality of additional entities to determine an optimal configuration. Specifically, the generation application 209 collects information from an equipment server 205 and other information sources 207 (both outside of the managed network 101) which it uses to derive a device chart (similar to that referenced above). The equipment server 205 provides information relating to the capabilities of each type of available wireless interface device 102. The information stored in the server 205 may be provided thereto by e.g., the various device 102 manufacturers; alternatively a network operator may enter it manually.

In another alternative embodiment, the equipment server 205 comprises a third party entity, which stores the pre-generated device chart. According to this embodiment, the registration application 208 consults the equipment server 205 by sending it information obtained from the user via a questionnaire (as discussed above with respect to FIG. 2a).

In another variant, in place of or in addition to requiring that the user fill out a questionnaire, the registration application 208 consults a plurality of third party information sources 207 to derive data relevant to configuration optimization. For example, the information sources 207 may include e.g., databases of home information. In this manner, the registration application 208 obtains an address of the subscriber from the billing server 152 and provides that to the information source 207 to identify construction details of the subscriber's premises. It may be determined for example that a particular address is in an apartment complex (as determined by consulting e.g., Internet databases such as Google®), and as such would have a pre-determined square footage and general floor plan—information which is obtainable from the external information sources 207 (such as Google, Zillow®, Trulia®, etc.). In this manner, the registration application 208 is able to use the information obtained from the information sources 207 (along with information obtained from the subscriber in some instances) to derive a score for the requested services. As discussed herein, the score is then compared to the device chart (derived and/or stored at the equipment server 205), which is then able to return an optimal configuration with respect to a number and type of wireless interfaces needed for servicing the subscriber's premises.

As discussed above with respect to FIG. 2a, once the optimal configuration is determined, an order or ticket is distributed to the distribution/installation entity 212. The ticket describes the wireless interface devices 102 needed and is utilized when stocking a technician's truck; or, alternatively, may be used to ship the appropriate devices to the subscriber.

In another embodiment, the network architectures of FIGS. 2a and/or 2b may be further expanded to include premises-specific service determinations useful in identifying an optimal service configuration.

Specifically, according to this embodiment, the questionnaire which is filled out by the consumer device 210 upon registration includes questions which establish the specific locations within the premises (e.g., living room, kitchen, bedroom, etc.) where the user of the plurality of devices that are intended to use the wireless connection (e.g., referred to collectively as the client devices 210) is likely to use each. In addition, for each of the client devices 210, the user may prioritize or otherwise allocate usage for the locations based on an estimated or actual use of the client device 210 at each specific location. Such prioritization may be utilize any type of scale or comparison mechanism, such as e.g., "fuzzy" variables such as "frequently", "rarely", "never", "seldom", "high", or "low", or discrete variables such as numeric value based on a given scale (e.g., 1 to 10 or 75% of the time). For example, a user might rarely use their laptop in the kitchen ("rarely"), but frequently use the same laptop in the office or bedroom ("frequently"). Likewise, a specific user might prioritize signal strength/bandwidth (roughly related to download/upload speed) over convenience or aesthetics (e.g., "I don't care where it is, so long as it's fast as possible" for a chronic high-bandwidth consumer, or "I am willing to sacrifice speed for having access (albeit slower) at more locations within the premises" for a less bandwidth-intensive, convenience-oriented user).

In yet another variant, one or more of the installation configuration optimization applications 214 provided to the client devices 210 (as discussed above) causes each of the client devices 210 to iteratively act as an access point, or operate in an ad-hoc network mode. A first client device 210, when acting as the access point, communicates wirelessly with each of the other client devices 210 within the premises (and within range of its wireless interface) to gather/access link data relating thereto. The link data may include for example and without limitation, Service Set Identifier (SSID), received signal level/strength (e.g., RSSI), physical link rate, link quality, missed beacons, packet loss, bit error rate (BER), packet error rate PER, etc. The link data may relate to the connectivity of the accessed client devices 210 over a given period of time ranging from a few seconds, or up to a few minutes, or even hours or more (such as where historical data for that particular location is available).

Note that the client devices 210 may communicate using any well-known communications protocol, whether wired or wireless (e.g., LAN/WAN, Ethernet, Wi-Fi, Bluetooth, etc.) when acting as the access point, to communicate relevant data relating to the other client devices 210 and/or for providing the data to a premises storage device or to a network storage device for processing thereat.

The client device 210 acting as the access point, in one embodiment, builds a table or other data structure of link data/statistics internally (using the application software present thereon), from data collected from the other client devices 210 in the premises network 200. The collected data (which may include e.g., SSID, received signal level/RSSI, physical link rate, link quality, missed beacons, packet loss, BER/PER, etc.) demonstrates how the client device 210 which is acting as the access point "views" each of the connected client devices 210 within the premises network 200 from a RF signal standpoint. The client device 210 may obtain a higher resolution or more detailed profile of the connectivity (link) data of each of the connected client devices 210 by increasing the sounding frequency (i.e., the frequency with which the client device 210 acting as the access point samples or "pings" the client devices 210 in the premises to obtain data therefrom). This approach may be implemented so as to increase the accuracy of the desired wireless interface device determination. For example, a single sampling or data point for a given client device may or may not be representative of the actual link performance over time, since variations in link performance as sensed by the "access point" client device may occur as a function of time due to, e.g., variations in the status/presence of interfering emitters, fading and path artifacts, etc. Hence, an averaged or otherwise multi-data-point evaluation will increase the likelihood that the characterization of the link is accurate.

The client device 210 then transmits the collected connectivity data to the network 101 (e.g., to the server 202 or process managed by the operator of the network 101), where the server evaluates the connectivity data as well as the user's answers to the questions to determine the optimal wireless interface device for the user's premise.

In yet another embodiment, the client device 210 acting as the access point transmits the collected connectivity data to a storage device (not shown) for subsequent analysis by, e.g., an application running on the user's PC, a gateway (if present), the server 202, or other device in communication with the storage device.

In addition, to the questions answered by the user, as will be discussed in greater detail below, the information gathered by the client device 210 may be extracted during the foregoing process which is used to have better granularity when determining the most optimal wireless interface device for the user's premises. For example, various data relating to the signal quality and amplification needed to transmit signals to and/or receive signals from individual ones of the client devices 210 is collected. The data may include e.g., Wi-Fi channel state, RF power/RSSI, delay, signal phase, signal quality, amplification, signal frequency (e.g., 2.4 GHz, 5 GHz, etc.), etc. The data may then be compared to previously gathered data and/or standard or reference data, or minimum acceptability criteria, such that the type of wireless interface device 102 for which communication to the client devices 210 is best may be selected by the server 202. An order or ticket is then provided to the distribution/installation entity 212 as appropriate.

Figure 3:
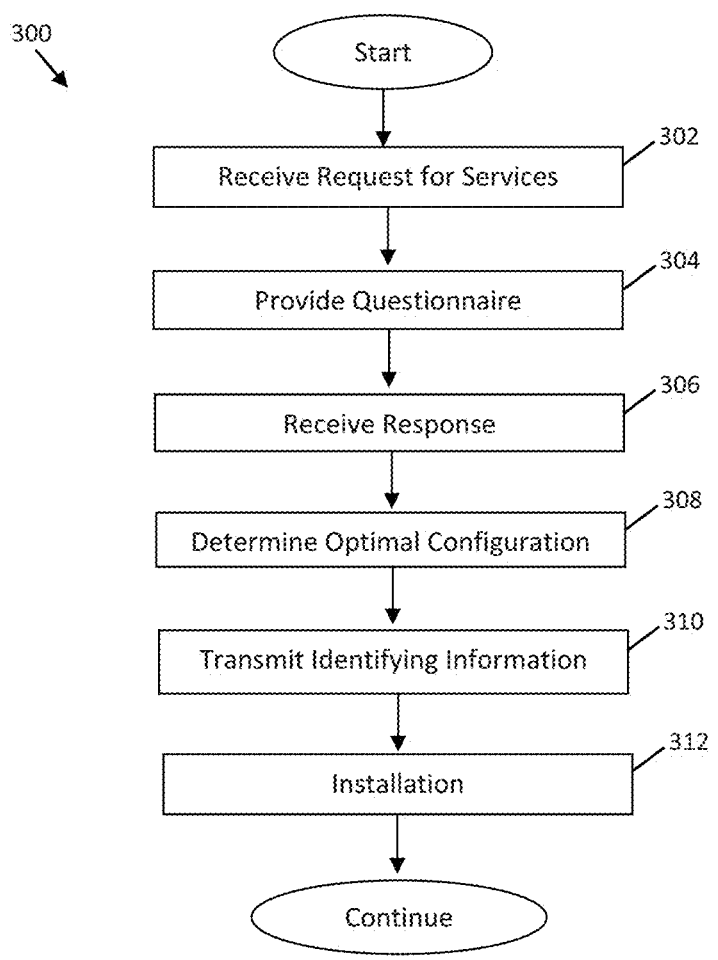
FIG. 3 is a logical flow diagram illustrating an exemplary method for determining an optimal installation configuration for wireless interface devices according to the present disclosure.

FIGS. 3-3c illustrate exemplary methods for use with the apparatus and systems disclosed in the networks of FIGS. 2a-2b.

Exemplary Methodology—

FIG. 3 illustrates an exemplary embodiment of a method 300 for determining an optimal installation configuration for wireless interface devices 102 within a user's premises.

As shown, the method 300 generally comprises receiving a request from the client device 210 for services associated with one or more wireless interface devices (step 302). In one embodiment, the request is made by a user when creating an account and logging in to the registration application 208 (such as via a corresponding client application 214).

For example, the request may be made by causing or allowing a user to access (e.g., download and install) one or more client applications 214 to one or more of the user's client devices 210. The applications 214 are downloaded directly from the network 101 (such as via a hub or headend entity). Alternatively, the applications 214 may be downloaded from the Internet (not shown). As previously noted, the application(s) may alternatively be prepositioned on the relevant devices, or yet other approaches may be used (e.g., peer-to-peer (P2P) sharing, etc.).

In another embodiment, the request is made by the user placing a phone call and speaking with a representative who has access to the registration application 208 at the server 202.

In yet another embodiment, the request is made by the user completing the provided questionnaire as described in more detail below as a "guest"In this embodiment, the user does not create an account or log in to the registration application 208.

Next, per step 304, the client device 210 is provided a plurality of questions, via the registration application 208 and/or the client registration application 214. In one embodiment, the questions inquire about the user's premises. For example, the questions may ask the type of premises the user lives in, the number of floors, the number of rooms, approximate square footage, approximately when the premises was built, and the type of materials used to construct the premises.

The questions may further inquire about the user's intended usage of the requested service. For example, the user may be asked how many people may be using wireless interface 102 in the premises. In addition, the user may be asked about their online activities, such as, streaming movies and/or music, playing video games, watching videos (i.e., YouTube), working from home, and/or general activities, such as viewing the news, shopping and/or email.

In yet another embodiment, the questions may further inquire about the type and number of client devices 210 used in the premises as well as the type of usage for each of the client devices 210. The types of client devices 210 may include for example, and without limitation, laptops, tablets, mobile phones, smart televisions, television streaming devices, eReaders, computer printers, thermostats, internet radio devices, etc. In addition, the user may rank (or other priority/allocation structure as described elsewhere herein) the devices 210. The use ranking/allocation may be for instance based on an estimate and/or actual use of the client devices 210 within the premises.

In yet another embodiment the user may be asked to create a plurality of location profiles for each of the client devices 210 within the premises. The location profiles, in one embodiment, include a location name (for example, office, bedroom, living room, kitchen, bathroom, etc.), and a user's use ranking (or other priority/allocation structure as described supra) of each. The use ranking/allocation may be for instance based on an estimate and/or actual use of the client devices 210 at each location. In another embodiment, the location profile further includes link (connectivity) data as discussed elsewhere herein.

Next the registration application 208 receives the user's responses to the questionnaire (step 306). In one embodiment, once the user's responses are received, the registration application 208 determines a subtotal score for each of the questions and/or categories of questions and applies a weighting value to the subtotal scores to determine a total score for the user's premises. In another embodiment, the user's subtotal score and/or total score are derived at the client device 210 such as via one of the client applications 214. According to this embodiment, the response may include at least one of: the user's responses to the questions, the subtotal scores, and/or the total score.

Next, the registration application 208 determines the optimal configuration, i.e., the number and type of wireless interface devices 102 needed to fulfill the service request, based on the given information by comparing the total score to a device chart (step 308). As noted above, the device chart may be located in the device database 204 or at the equipment server 205. Moreover, the chart may be pre-generated and simply placed thereat by a third party. Alternatively, it may be generated by a network 101 entity using information from various third party sources. Once the registration application 208 determines the requisite wireless interface device(s) 102, the server 202 transmits information identifying the number and type of wireless interface device(s) 102 needed to the distribution/installation hub 212 (step 310). The identified wireless interface device(s) 102 is then added to an installation order and a technician may be notified. The technician then installs the wireless interface device(s) 102 at the user's premises (step 312). Alternatively, the device(s) 102 may be shipped or otherwise provided to the user himself for installation without the assistance of a technician, or with minimal assistance (such as over the phone or Internet).

Figure 3A:
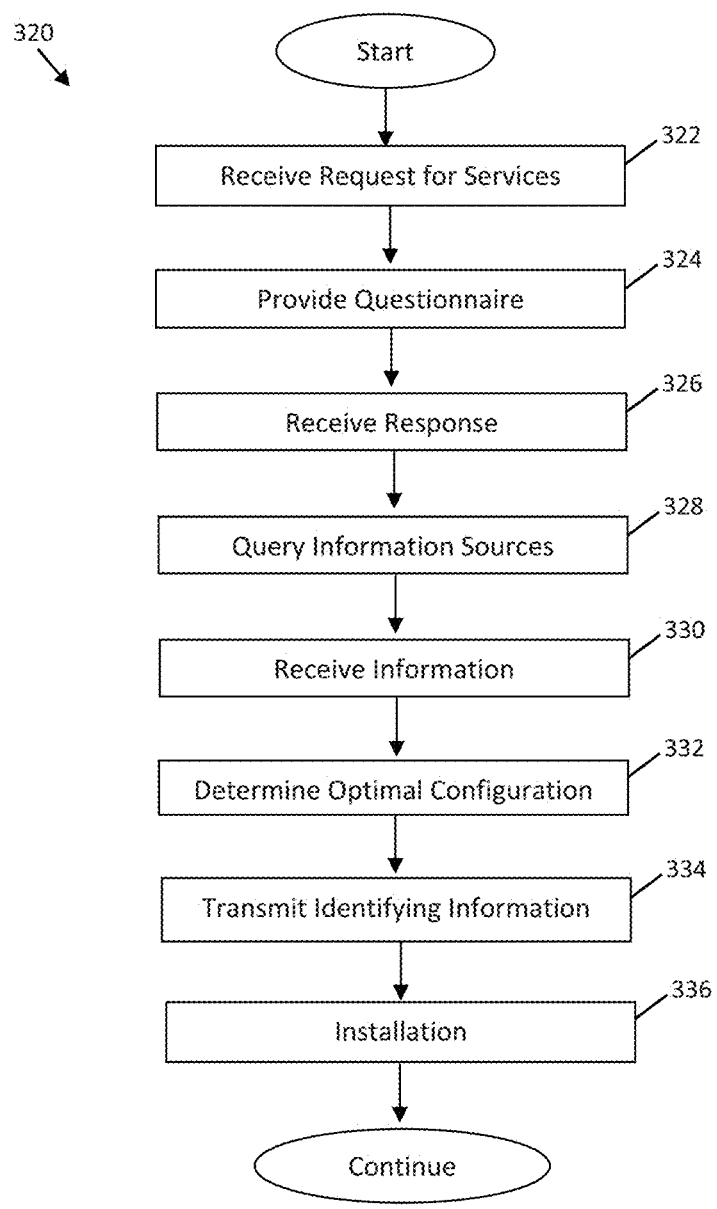
FIG. 3a is a logical flow diagram illustrating a specific variant of an exemplary method for determining an optimal installation configuration for wireless interface devices according to the present disclosure.

Referring now to FIG. 3a, a specific variant of an exemplary method 320 for determining an optimal installation configuration for wireless interface devices 102 within a user's premises according to the present disclosure is given. As shown, the method 320 generally comprises first, at step 322, receiving a request from the client device 210 for services associated with one or more wireless interface devices 102. In one embodiment, the request is made by the user creating an account or logging in to the registration application 208 (such as via a corresponding client application 214). In another embodiment, the request is made by the user completing the provided questionnaire as described in more detail below as a "guest"In this embodiment, the user does not create an account or log in to the registration application 208.

In one example, the request comprises causing or allowing a user to access (e.g., download and install) the one or more client applications 214 to one or more of the user's client devices 210. The applications 214 may be downloaded directly from the network 101 (such as via a hub or headend entity), or from the Internet (not shown), or the application(s) 214 may be prepositioned on the device(s).

In another embodiment, the request is made by the user placing a phone call and speaking to a network 101 operator with direct access to the registration application 208 at the server 202.

Next, per step 324, the client device 210 is provided questionnaire. The questionnaire of this embodiment comprises a modified plurality of questions, which are in one embodiment less intrusive or time consuming for the user to answer. For example, the questions may inquire generally about the user's premises, or may be of a general nature, such as simply requesting the user's name, address, family size, and ages. As discussed elsewhere, from this information intended use, number of devices, and physical nature of the user's home may be derived. For example, if a user enters that the family size is four having ages 35, 33, 2 and 1, it can be determined that the family likely has at least two mobile devices, at least two laptops and/or tablets, and at least one smart television; and demographics of a family such as this (i.e., young, new parents) indicate that the adults likely use their services for streaming movies and online shopping. Alternatively, if the children are older, it is likely that they also have mobile devices and the number of smart televisions, laptops, etc. is noted to increase; additionally this new demographic is likely to use the services to stream music and play games online.

Next the registration application 208 receives the user's responses (step 326). The registration application 208 extracts at least the user's name and/or the user's premises address and queries one or more information sources 207 to determine the characteristics of the user's premises (step 328). The registration application receives the queried information from the one or more information sources (step 330). For example, the one or more information sources 207 may include such servers as Trulia and/or Zillow. The registration application 208 provides a physical address to the information sources 207 and receives in response the type of premises, the number of floors, approximate square footage, outside construction material and when the premises was built. In another variant, county records, tax records, census information and/or accounting information may be accessed as information sources 207 and information obtained therefrom in response to an address-based query comprises the relevant premises information.

The registration application 208 next determines a subtotal score for each of the questions and/or categories of questions and applies a weighting value to the subtotal scores to determine a total score for the user's premises.

Per step 332, the registration application 208 determines the optimal configuration, i.e., the number and type of wireless interface devices 102 needed to fulfill the service request, based on the given information by comparing the total score to a device chart (located in the device database 204 or at the equipment server 205). The device chart may be pre-generated by a third party or generated by a network entity.

Once the registration application 208 determines the wireless interface device(s) 102, the server 202 transmits information identifying the number and type of wireless interface device(s) 102 needed to the distribution/installation hub 212 (step 334). The identified wireless interface devices 102 are then added to an installation order and a technician may be notified. The technician or a user himself then installs the wireless interface device at the user's premises (step 336).

Figure 3B:
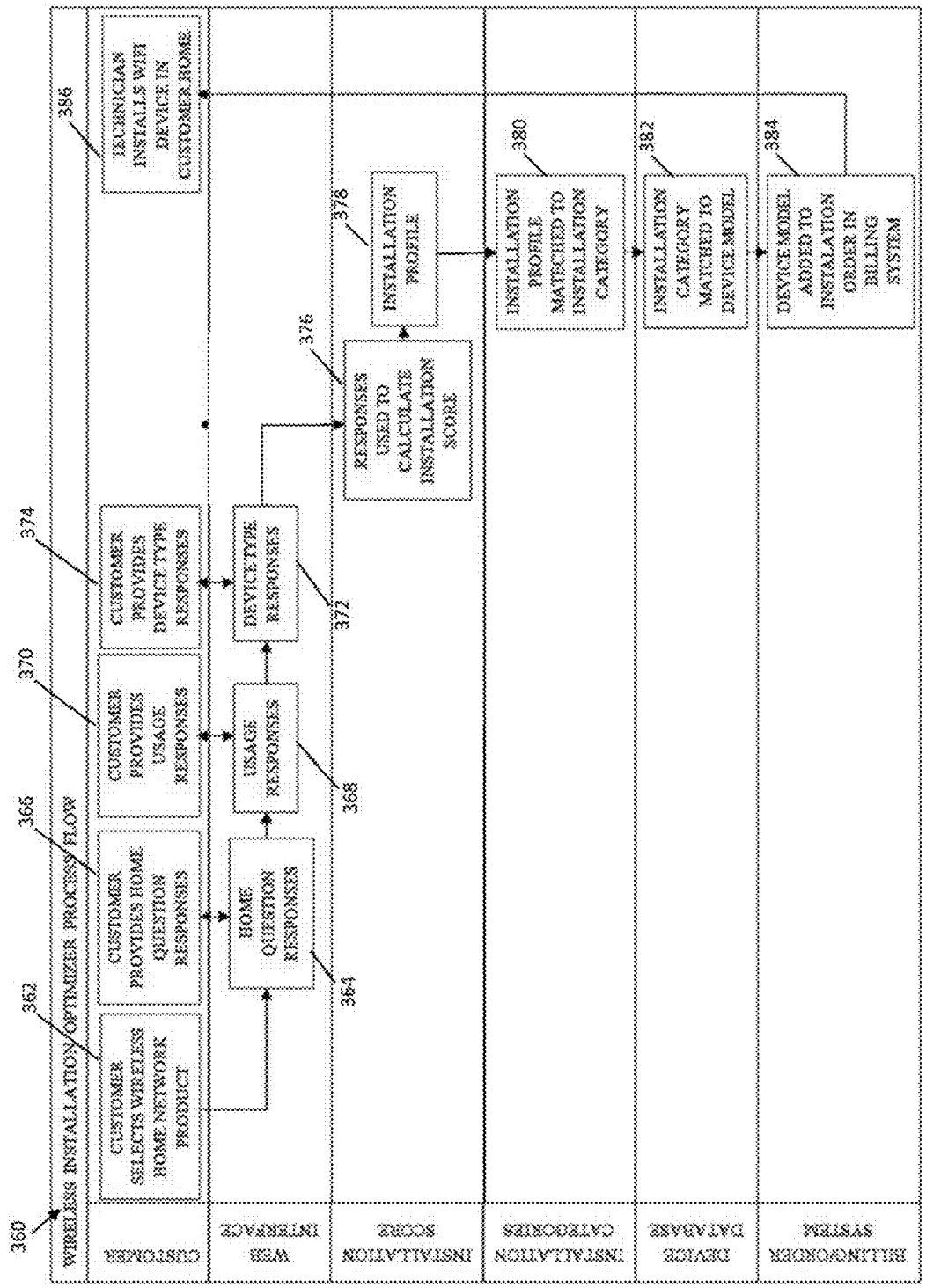
FIG. 3b is a logical flow diagram illustrating another specific variant of an exemplary method for determining an optimal installation configuration for wireless interface devices according to the present disclosure.

Referring now to FIG. 3b, another specific variant of an exemplary method 360 for determining an optimal installation configuration for wireless interface devices 102 within a user's premises according to the present disclosure is given. As shown, the method 360 generally comprises a user selecting a wireless home network service (step 362).

Upon the request, the user is provided with one or more questions, via a web interface, regarding the user's premises (step 364). The user then provides responses to the so-called "home" questions at step 366. The user then is provided with one or more questions regarding the user's intended usage (step 368). The user then provides responses to the so-called "use" questions at step 370. Next per step 372, the user receives one or more questions regarding the type and number of devices the user intends to use within the premises. The user then provides responses to the so-called "device" questions at step 374.

At step 376, the responses to the home, use and device questions are used to calculate an installation score as well as an installation category. As will be discussed in greater detail below, the total installation score may comprise a raw score based on home, use, or device with a weighting factor applied to each. In another embodiment, the installation score or a weighting thereof is further based on a user's provided hierarchy or ranking associated with each of the responses. Specifically, in one variant, a user may designate a "heavy use" for a particular location or client device 210; hence this location or device 210 is given more weight in the analysis of an optimal installation configuration (i.e., the heavy use location or client device will be optimized preferentially, or even to the detriment in extreme cases, of other locations or client devices). The installation categories comprise fixed categories of service based on e.g., a number of floors to a home and/or square footage of a home. The combined total score and device category are combined to generate an overall installation profile (step 378).

The installation profile is then matched to an installation category and score pair listed in the device chart (as will be discussed in greater detail below) at step 380. The pairing is in turn matched to device model(s) at step 382 (also discussed below).

Once the specific number and model of wireless interface devices 102 is determined, these particular devices are added to an installation order in the billing entity 152 and a technician is deployed with the appropriate devices 102 for installation. As noted above, the foregoing methods may also be utilized to ensure that a technician's service vehicle is stocked for the specific service calls he/she will attend to. In another embodiment, the foregoing methods may also be utilized to ship the appropriate devices 102 to the user's premises.

FIG. 3c is a logical flow diagram illustrating a specific variant of an exemplary input/output process 390 for determining an optimal installation configuration for wireless interface devices according to the present disclosure.

As shown, the process 390 generally comprises obtaining customer installation information (step 391). This may include, for example, the user's initiating a call to a managed network 101 operator, accessing a web interface, or downloading and beginning a client registration application 214. In response the server registration application 208 requests home, usage, and device information.

Next begins the installation scoring step (step 392), in which the user provides the requested home, usage, and device information (and/or a portion of the information is obtained from outside sources 207) and in turn the registration application 208 outputs an installation profile. Once the installation profile is output, the installation category is assessed (step 393) and an installation category is output (as will be discussed in greater detail below with respect to FIG. 5). Upon consultation of the device database 204 (or equipment server 205), a device model selection is output (step 394).

At step 395, the device model selection is added to an installation order, and the installation order is then utilized to install the appropriate devices (step 396).

The foregoing methods of FIGS. 3-3c rely, in one embodiment, on a user's response to questions asked via a questionnaire. FIGS. 4a-4b illustrate exemplary questionnaire interfaces for use in accomplishing the foregoing methods.

Exemplary Registration Interface—

Referring now to FIG. 4a an exemplary registration interface 400 comprising a plurality of home questions 410, usage questions 420 and device questions 430 is illustrated.

In the illustrated embodiment, the home questions 410 include questions such as a home question 411, which asks what type of premises the user lives in. In one embodiment, the user is provided with a list of type of premises to choose from. The list may include such premises choices as, apartment/condo, single family home, and townhouse/duplex. The foregoing options are merely provided as an example, other premises choices may further be provided.

The next home question 412 asks for the number of floors of the user's premises (including the basement in this example). As shown, the user is provided with a list of number of floors to choose from (e.g., one floor, two floors, three floors, and more than three floors).

The next home question 413 asks for the number of rooms included in the premises. The question may further provide definitions as to what is to be considered a "room" for the purposes of the question (i.e., bathrooms, kitchen, etc.). Again, the user may select an answer from a list of options including, e.g., selecting between a number range of rooms (1-3 rooms, 4-8 rooms, 9-12 room and 13 or more rooms, etc.). In another embodiment, the user may be presented with individual room selection, such as, selecting the number of bathrooms, the number of bedrooms, and yes or no questions as to the presence of other rooms (e.g., basement, etc.). In yet another embodiment, the user may be presented with a list or drop down menu allowing the user to select the total number of rooms. For example, the drop down menu may allow the user to select 1 room, 2 rooms, 3 rooms, etc.

Home question number 4 (four) 414 asks the user for the approximate square footage of the user's premises. In one embodiment, the user is provided with range of values such as: under 1,000 square feet, from 1,000 square feet to 2,000 square feet, from 2,000 square feet to 3,000 square feet, and over 3,000 square feet. In another embodiment, the user may be presented with a list or drop down menu allowing the user to select a more specific square footage. The drop down menu, in one embodiment, may increase in increments, such as 500 square foot increments: 0-500 square feet, 500-1,000 square feet, etc.

The next home question 415 asks the user for the type of construction material used to construct the premises. Various construction materials representative of typical construction materials for the outside of the premises are listed. The list may include such choices as, aluminum siding, vinyl siding, brick, stone/cement, and wood/shingle. In another embodiment, the user is also asked the construction materials used in the inside of the premises. In this embodiment, the user is provided with a list of choices to choose from including such choices as: plaster, drywall cement, wood, or any other suitable interior construction material (as specified for floors, walls, ceilings, etc.).

Although not illustrated, it is also appreciated that a user may be asked very specific questions relating to each of the floors and rooms of the premises. For example, an entry of two floors to the premises may prompt the question, of whether the second floor is carpeted, wood, or a mix of both. An entry by the user that there are 3 bedrooms may prompt further questions such as the material of the walls for each room, how big each room is individually, where they are located within the home (i.e., center, corner, second-floor, etc.).

Home question number 6 (six) 416 asks approximately when the premises was built. The user may be provided a list of ranges including such choices as, since the year 2000, during the 1980's or 1990's, during the 1960's or 1970's, during the 1940's or 1950's and before the 1940's. In another embodiment, the user may be presented with a list or drop down menu allowing the user to select the specific year the premises was built (i.e., 1971, etc.).

Although not illustrated, the home questions 410 may further ask for the user's premises address. As discussed above with respect to FIGS. 2b and 3a, the user's premises address may be used to query at least one or more information sources 207 to determine the characteristics of the user's premises without having to ask specific questions such as those identified above. Alternatively, the information sources 207 may be consulted first, and based on what cannot be derived therefrom further questions maybe asked of the user. For example, servers such as trulia.com and zillow.com may identify the type of premises, the number of floors, approximate square footage, outside construction material and when the premises was built. However, they may be inaccurate and therefore require a user's confirmation and/or require the user to fill-in what cannot be derived elsewhere.

The usage questions 420 in general ask about the user's anticipated online activities. As illustrated, usage question 421 asks how many people in the premises are anticipated to use wireless services. In this embodiment, the user is provided with a list of options including a number range to choose from (e.g., 1-2 people, 3-4 people and 5 or more people). In another embodiment, the user may be presented with a list or drop down menu allowing the user to select the specific number of people in the premises that uses wireless. Still further, the user may enter the ages of each person in the premises; in this manner the registration application 208 may imply a usage amount based on age (e.g., persons under 7 and over 65 will have less usage than persons in the 13-25 age group).

Usage question number 2 (two) 422 which asks about specific online activities the user requires for the wireless connection. In this embodiment, the user is provided with a list of options including such choices as: general internet surfing which includes, viewing the news, shopping, checking email, watching videos on a computer/tablet/smart phone, streaming movies and television shows (i.e., YouTube, Netflix, Hulu, etc.), streaming music (i.e., Pandora, Slacker, iHearRaio, etc.), streaming podcasts, playing video games online, and working from home. Again, the foregoing examples are merely intended to be exemplary of the concept and are in no way limiting of the typical uses that may be listed. The foregoing list may comprise a series of buttons or toggle switches that enable the user to indicate one or more of the list that are anticipated to be performed.

The device questions 430 generally ask the user about the number and type of devices the user intends to use to access the wireless connection. In one embodiment, device question 413 lists a plurality of possible devices, such as laptops/tablets, cell phones, smart phones, smart televisions, television streaming devices (i.e., Apple TV, Roku, Amazon FireTV etc.), eReaders (i.e., Kindle, NOOK, etc.), computer printers, and thermostats, internet radio devices etc. In one variant, the user upon selecting the type of device may enter the number of each particular device that the user intends to use with a wireless connection; alternatively a drop down list may be provided. For example, the user may select laptop/tablets as the type of device. The user then may either input manually or select from a drop down list the number of laptops/tablets that the user intends to use.

Referring now to FIG. 4b, another specific variant of an exemplary registration interface 450 for determining an optimal installation configuration for wireless interface devices within a user's premises according to the present disclosure is given. The interface 450 generally comprises several questions for a user to answer. The questions can include questions regarding the premises, usage and/or devices. As shown, this particular interface 450 provides the user with questions regarding the user's premises and possible answers in a multiple choice format. The user upon reading the question may select the most appropriate answer by clicking or touching the selected answer. Additionally, the interface of FIG. 4b includes user friendly pictures and icons. Although not illustrated, this format for a user interface for the questionnaire may be utilized to present the user with home, usage and device questions similar to those discussed above with respect to FIG. 4a.

Upon answering all of the questions the user may submit the answers to the registration application 208. As discussed elsewhere herein, the user's answers are totaled and weighted to determine a total score as well as a category of service (referred to collectively as a consumer profile); an exemplary interface for calculating a consumer profile is given in FIG. 5 discussed below.

Exemplary Score Calculation Interface—

Referring now to FIG. 5 an exemplary interface 500 for calculating a consumer profile is given. The interface 500 is populated with information derived from the registration interface 400 of FIG. 4a and/or the interface 450 of FIG. 4b. That is, the user's entries in the GUI of FIG. 4a or 4b are placed in the appropriate locations of the calculation interface 500. In addition or alternatively, these fields may be populated using information obtained from the third party information sources 207 discussed above.

For certain ones of the questions, a pre-set weight is applied to each possible answer. For example, the answers to home question one 510 have possible weights of 1.5 (for apartments/condos), 1.0 (for single family homes), and 1.5 (for townhomes/duplexes). The pre-set weight is applied to each of: answers to home question one 510, answers to home question three 530, answers to home question five 550, answers to home question six 560, answers to usage question one 570, answers to usage question two 580, and device question one 590. Accordingly, the interface will arrive at a sub-total score for each of these questions (e.g., subtotals 511, 531, 551, 561, 571, 581, and 591).

In addition, certain questions are deemed "category questions" The category questions comprise those threshold questions to which an answer will place the user in one of a plurality of categories of service. Exemplary category responses include the answer to home question two 520, and the answer to home question four 540. Specifically, the number of floors of a premises and the square footage of a premises (520 and 540) have a profound impact on the number and type of devices required to provide service to the premises. Hence, the answers to these questions separate users in to distinct service categories.

The overall total score (the sum of subtotals identified above) and identified categories are then listed as a consumer profile 599.

In the illustrated example, the user has a total score of 61.5. This number is arrived at by totally the user's answers (or otherwise obtained answers) as follows:

| Answers | Score Subtotal |
|---|---|
| The premises is a townhome/duplex | 1.5 |
| The premises has 13 or more rooms | 4 |
| The premises is constructed of stone/cement | 3 |
| The premises was built before 1940 | 3 |
| At least 4 or more users will use the service | 3 |

| Answers | Score Subtotal |
|---|---|
| The overall usage includes all of the listed usages | 16 |
| The number and types of devices | 32 |
| Total | 61.5 |

Moreover, the user's premises has more than three floors therefore is in category D, and has a square footage of over 3,000 square feet thus placing it in category Z. Therefore, the consumer profile 599 is listed as 61.5 DZ.

Other weighing factors and questions may be used to arrive at a consumer profile, the foregoing are merely exemplary of the overall concept. For example, a user provided ranking or allocation associated with each of the responses (such as by estimated and/or actual use of the client device 210) may be used to weight the received responses. Further granularity may also be provided such as enabling the user to designate a use level at certain locations or a hierarchy among devices (i.e., the heavy use location or client device will be optimized preferentially, in some cases even to the detriment of other locations and/or client devices). In another embodiment, a table of link statistics (such as that derived in co-owned, co-pending U.S. patent application Ser. No. 14/302,313 filed on Jun. 11, 2014 and entitled "METHODS AND APPARATUS FOR ACCESS POINT LOCATION", which was previously incorporated herein by reference in its entirety) may be utilized to weight certain responses and/or devices.

The consumer profile derived using the calculation interface 500 is then used to determine an optimal configuration via a device chart (such as that discussed in FIG. 6 below).

Exemplary Device Chart—

FIG. 6 is an illustration of an exemplary device chart 600 for determining an optimal installation configuration for wireless interface devices according to the present disclosure.

As shown, the exemplary device chart 600 comprises a plurality of columns representative of score ranges and a plurality of rows representative of category types. Using the consumer profile example of FIG. 5, it is apparent that the score of 61.5 places the user in column 601, and the category of DZ places the user in row 602. Hence, the installation or service profile 603 requires that two of device type 2 and 1 repeater be placed in the premises.

The installation order or ticket may therefore be assigned for the given service profile 603. As note elsewhere herein, a technician may receive the service ticket and stock his vehicle in anticipation of servicing the order accordingly. Alternatively, the user may install the equipment without the assistance of an in-person technician.

The first and second device type 2 and the repeater should be placed within the premises in a manner that provides for optimal service for every device in every location within the premises. To that end, the methods and apparatus of co-owned, co-pending U.S. patent application Ser. No. 14/302,313 filed on Jun. 11, 2014 and entitled "METHODS AND APPARATUS FOR ACCESS POINT LOCATION", which was previously incorporated herein by reference in its entirety, may be utilized during the installation process to determine an optimal location for the devices 102 to be installed within the premises.

Exemplary Server Apparatus—

Figure 7:
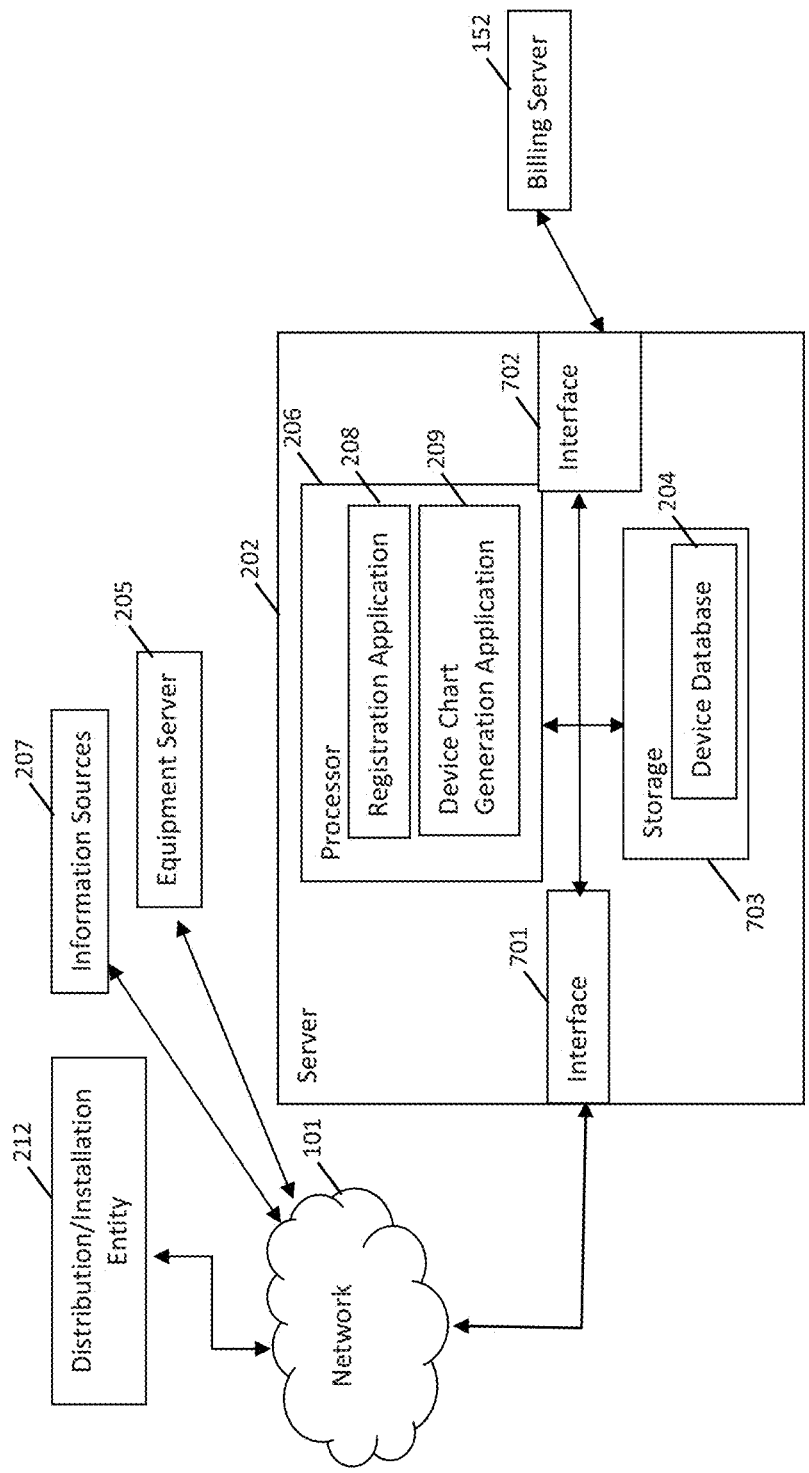
FIG. 7 is a functional block diagram of an exemplary server apparatus for determining an optimal installation configuration for wireless interface devices according to the present disclosure.

FIG. 7 is a functional block diagram of an exemplary server apparatus 202 for determining an optimal installation configuration for wireless interface devices according to the present disclosure. As shown, the server device 202 generally comprises a network interface 701, a backend interface 702, a processor 206, and an associated storage device 703. In the illustrated embodiment, the processor 206 is configured to run at least a registration application 208 and optionally a device chart generation application 209 thereon.

The registration application 208 comprises a computer program that enables the server to request and receive information from the client device 210 during a registration for services. Additionally, the registration application 208 is configured to request additional information from information sources 207 and the equipment server 205. Further, as noted elsewhere herein, the registration application 208 enables the server 202 to process the user premises information, compile a consumer profile, compare the consumer profile to the device chart, and determine a service profile. The registration application 208 may further notify the distribution/installation entity 212 of the installation order either directly or via the billing entity 152.

The device chart generation application 209 is optionally run on the server 202. The device chart generation application 209 enables the server to gather information regarding a plurality of available wireless interface devices 102 and use this information to determine an optimal installation configuration given a unique user household.

A network interface 701 is in one embodiment configured to enable the server 202 to communicate with various entities via the network 101 (such as e.g., the client device 210, the equipment server 205, the information sources 207, and/or the distribution/installation entity 212), and may comprise for example a DOCSIS modem interface, HFC "in band" RF interface, DSL (e.g., copper telephony and modem) interface, optical fiber interface, wireless satellite (e.g., DSS) interface, WiMAX interface, or yet others.

The backend interface 702 provides communication between the server device 202 and various other headend devices, such as e.g., the billing server 152. Communication between these devices may occur via a wired or wireless communication therewith, such as via e.g., IEEE-1394 (so called "FireWire"), USB, LAN/WAN, WLAN, Wireless, etc. communications.

This storage device 703 may be "stand alone" (e.g., a separate mass storage device such as a disk or flash drive, RAID array etc.), or may be incorporated into the server 202 as illustrated. The storage device 703 is configured to store the device database 204 in one embodiment.

Exemplary Client Device—

Figure 8:
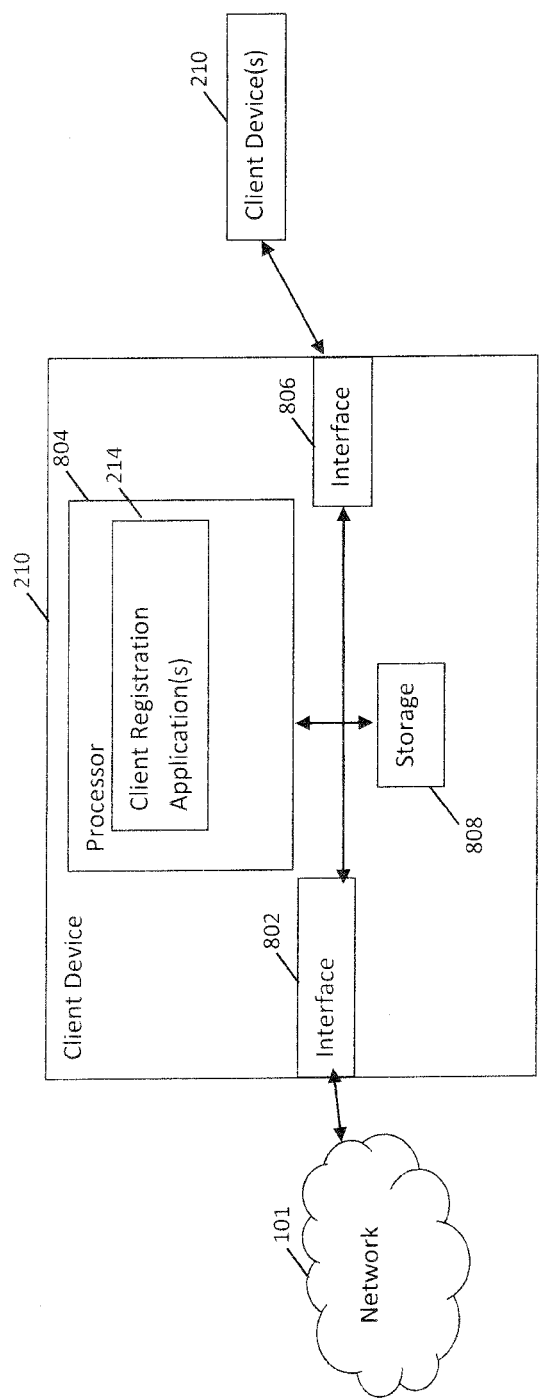
FIG. 8 is a functional block diagram of an exemplary client device for determining an optimal installation configuration for wireless interface devices according to the present disclosure.

FIG. 8 is a functional block diagram of an exemplary client device 210 for determining an optimal installation configuration for wireless interface devices according to the present disclosure. As shown, the device 210 generally comprises a network interface 802, premises interface 806, a processor 804, and associated storage 808. It will be appreciated that while described somewhat generically herein, the individual client devices may both (i) be heterogeneous or homogeneous in nature/capability; and (ii) be integrated into or make use of extant devices/form factors such as smartphones, tablets, phablets, laptops, handhelds, gaming devices, wireless routers, etc. In addition, the client device 210 may be combined with other functions and/or form factors, such as existing premises components such as gateways, computers, settop boxes (e.g., DSTBs), and the like.

The network interface 802 provides, inter alia, content and data delivery to and from the managed network 101. Alternatively, the network interface may enable the device 210 to communicate via a cellular network, WiMAX network, etc. For instance, the client device 210 may comprise a cellular or WIMAX enabled smartphone, which can communicate independently of its premises interface (e.g., WLAN).

The premises interface 806 provides inter alia, communication between the client device 210 and various devices within a premises, such as e.g., other client devices 210, and the access point device(s) 102. For example, the premises interface 806 in one variant comprises e.g. IEEE-1394, USB, wired LAN/WAN, Wireless, Wi-Fi, etc.

In the illustrated embodiment, the processor 804 is configured to run a client registration application 214 (e.g., the user-downloaded application previously described) thereon. Alternatively, the application 214 may be pre-loaded on the device 210, or merely accessed by the device without requiring a client version necessarily.

The client application 214 is configured to enable a user to communicate with the server registration application 208 such as by enabling the user to provide answers to the registration questionnaire.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the disclosure. This description is in no way meant to be limiting, but rather should be taken as illustrative of the general principles of. The scope of the disclosure should be determined with reference to the claims.

What is claimed is:

1. A computerized network apparatus configured to determine a desired installation configuration within a premises of a user, said computerized network apparatus comprising:
   a first interface in data communication with a network;
   a storage apparatus; and
   a processor apparatus configured to execute at least one computer program, said at least one computer program comprising a plurality of instructions which are configured to, when executed by said processor apparatus:
      receive, via a message generated by one or more computer program applications operative to run on at least one of a plurality of wireless-enabled computerized client devices of said user, data representative of a request for services;
      cause, by said one or more computer program applications, each of said plurality of wireless-enabled computerized client devices to act as an ad hoc access point, wherein said plurality of wireless-enabled computerized client devices are each configured to perform the steps of:
         exchanging signals between one another, in an iterative fashion; and
         collecting link data relating to one or more radio frequency characteristics at each of a plurality of locations in said user's premises where said plurality of wireless-enabled computerized client devices are disposed, said iterative fashion comprising only one of said plurality of wireless-enabled computerized client devices being utilized as said ad hoc access point at a time;
      receive, by said one or more computer program applications, said link data of each of said plurality of wireless-enabled computerized client devices; and
      evaluate said link data to determine an optimized configuration for said premises of said user, said determination of said optimized configuration based at least in part on one or more effects of one or more features of said premises on signal frequencies of said plurality of wireless-enabled computerized client devices.

2. The apparatus of claim 1, wherein said plurality of instructions are further configured to, when executed, register said at least one of said plurality of wireless-enabled computerized client devices.

3. The apparatus of claim 2, wherein said registration of said at least one of said plurality of wireless-enabled computerized client devices further comprises creation of a plurality of respective location profiles for each of said plurality of wireless-enabled computerized client devices within said premises of said user.

4. The apparatus of claim 1, wherein said plurality of instructions are further configured to, when executed, determine a subtotal score for each of said plurality of wireless-enabled computerized client devices.

5. The apparatus of claim 4, wherein said plurality of instructions are further configured to, when executed, apply a weighting value to said subtotal score to determine a total score for said user's premises.

6. The apparatus of claim 1, wherein said iterative fashion further comprises at least:
   (i) a first one of said plurality of wireless-enabled computerized client devices to radiate radio frequency signals, and a second one of said plurality of wireless-enabled computerized client devices to receive said radio frequency signals radiated from said first one of said plurality of wireless-enabled computerized client devices; and
   (ii) said second one of said plurality of wireless-enabled computerized client devices to radiate radio frequency signals, and a third one of said plurality of wireless-enabled computerized client devices to receive said radio frequency signals radiated from said second one of said plurality of wireless-enabled computerized client devices.

7. A computerized method for determining a desired installation configuration within a premises associated with one or more users, said method comprising:
   receiving, by a computerized network entity, data representative of a request for services, said request provided by at least one of said one or more users for at least one of a plurality of wireless-enabled computerized client devices within said premises;

providing, by said computerized network entity, said plurality of wireless-enabled computerized client devices with at least one installation configuration optimization application;

calculating, by said computerized network entity, an installation score based at least in part on link data received from said at least one installation configuration optimization application;

causing configuring, by said at least one installation configuration optimization application, each of said plurality of wireless-enabled computerized client devices to perform the steps of:
    exchanging signals between one another, in an iterative fashion; and
    collecting said link data relating to one or more radio frequency characteristics at each of a plurality of locations in said user's premises where said plurality of wireless-enabled computerized client devices are disposed, said iterative fashion comprising only one of said plurality of wireless-enabled computerized client devices being utilized as an ad hoc access point at a time;

evaluating, by said computerized network entity, said installation score to determine an optimal configuration for said premises, wherein said installation score comprises at least a raw score based at least in part on an effect of said one or more radio frequency characteristics of said premises on a signal of said at least one of said plurality of wireless-enabled computerized client devices; and transmitting, by said computerized network entity, said optimal configuration to a computerized billing entity.

8. The method of claim 7, wherein said at least said raw score is further based at least on a usage associated with each of said plurality of wireless-enabled computerized client devices within said premises, said usage based at least in part on respective age groups associated with said one or more users.

9. The method of claim 7, further comprising combining said installation score and a device category for creating an installation profile.

10. The method of claim 9, further comprising pairing said installation profile to an installation category and a score pair listed on a device chart.

11. The method of claim 10, wherein said pairing results in a device model being determined.

12. Computer readable apparatus comprising a non-transitory storage medium, the non-transitory medium comprising at least one computer program having a plurality of instructions, said instructions configured to, when executed on a processing apparatus:

receive, via a message generated by one or more computer program applications operative to run on at least one of a plurality of wireless-enabled computerized client devices of a content delivery network, data representative of a request for services;

cause, by said one or more computer program applications, each of said plurality of wireless-enabled computerized client devices to act as an ad-hoc wireless access point, wherein said plurality of wireless-enabled computerized client devices are each configured to perform the steps of:
    exchanging wireless signals between one another, in an iterative fashion, said iterative fashion comprising only one of said plurality of wireless-enabled computerized client devices being utilized as said ad hoc access point at a time; and
    collecting link data relating to one or more radio frequency characteristics at each of a plurality of locations in a premises where said plurality of wireless-enabled computerized client devices are disposed;

receive said link data of each of said plurality of wireless-enabled computerized client devices; and perform a computerized evaluation of said link data to determine an optimized configuration for said premises, said determination of said optimized configuration based at least in part on data relating to one or more effects of one or more features of said premises on signal frequencies of said plurality of wireless-enabled computerized client devices.

13. The computer readable apparatus of claim 12, wherein said instructions are further configured to, when executed on said processing apparatus:

cause rendering on a device display of a plurality of questions relating to said one or more features of said premises on said at least one of said plurality of wireless-enabled computerized client devices, said one or more features comprising a plurality of physical construction characteristics, said plurality of physical construction characteristics affecting wireless operation of said plurality of wireless-enabled computerized client devices;

receive data relating to one or more responses to one or more of said plurality of questions; and conduct a computerized query, based on said data relating to said one or more responses, one or more computerized information sources to determine additional data regarding said premises, said additional data comprising at least data representative of a square footage of said premises.

14. The computer readable apparatus of claim 13, wherein said instructions are further configured to, when executed on said processing apparatus:

extract at least data indicative of a user's name and/or a user's premises address from said data relating to said one or more responses; and transmit said at least data indicative of said user's name and/or said user's premises address to said one or more computerized information sources in order to effect said query.

15. The computer readable apparatus of claim 13, said plurality of physical construction characteristics comprise at least one of: (i) a number of floors within said user's premises, (ii) an approximate square footage of said user's premises, and (iii) one or more construction materials of said user's premises.

16. The computer readable apparatus of claim 13, wherein said instructions are further configured to, when executed on said processing apparatus:

determine, based on said receipt of said data relating to said one or more responses, a subtotal score for each of said of one or more of said plurality of questions and/or one or more categories thereof, said subtotal score used in said determination of said optimized configuration.

17. The computer readable apparatus of claim 16, wherein said instructions are further configured to, when executed on said processing apparatus:

apply a weighting value to said subtotal score for each of said of one or more of said plurality of questions and one or more categories of service associated therewith thereof;

determine a total score for said premises, said total score based at least in part on said weighting value; and generate data representative of a consumer profile, said consumer profile indicative of at least said total score and said one or more categories of service associated with said of one or more of said plurality of questions.

18. The computer readable apparatus of claim 17, wherein said instructions are further configured to, when executed on said processing apparatus:

compare said consumer profile to a device data structure, said device data structure generated by a server apparatus and comprising: (i) a plurality of different categories corresponding respectively to a plurality of premises types, and (ii) a plurality of score ranges.

19. The computer readable apparatus of claim 18, wherein said instructions are further configured to, when executed on said processing apparatus:

based on said comparison, generate service profile data, said service profile data indicative of one or more particular computerized devices to be disposed in said premises according to said optimized configuration.

20. The computer readable apparatus of claim 19, wherein said instructions are further configured to, when executed on said processing apparatus:

based on said data representative of said request for services, cause creation of account data via utilization of said one or more computer program applications, said account data comprising billing data useful for a computerized billing entity to generate subscription cost data for said one or more particular computerized devices.

* * * * *

UNITED STATES PATENT AND TRADEMARK OFFICE
CERTIFICATE OF CORRECTION

PATENT NO. : 9,935,833 B2
APPLICATION NO. : 14/534067
DATED : April 3, 2018
INVENTOR(S) : Bryan McAllister It is certified that error appears in the above-identified patent and that said Letters Patent is hereby corrected as shown below:

In the Claims

Currently reads (Claim 1 – Columns 23-24):
"1. A computerized network apparatus configured to determine a desired installation configuration within a premises of a user, said computerized network apparatus comprising:
    a first interface in data communication with a network;
    a storage apparatus; and
    a processor apparatus configured to execute at least one
        computer program, said at least one computer program
        comprising a plurality of instructions which are configured to, when executed by said processor apparatus:
        receive, via a message generated by one or more
            computer program applications operative to run on at
            least one of a plurality of wireless-enabled computerized client devices of said user, data representative
            of a request for services;
        cause, by said one or more computer program applications, each of said plurality of wireless-enabled
            computerized client devices to act as an ad hoc
            access point, wherein said plurality of wireless-enabled computerized client devices are each configured to perform the steps of:
    exchanging signals between one another, in an iterative fashion; and
    collecting link data relating to one or more radio
        frequency characteristics at each of a plurality of
        locations in said user's premises where said plurality of wireless-enabled computerized client
        devices are disposed, said iterative fashion com- Signed and Sealed this
Eleventh Day of December, 2018

Andrei Iancu
*Director of the United States Patent and Trademark Office*

CERTIFICATE OF CORRECTION (continued)

U.S. Pat. No. 9,935,833 B2 prising only one of said plurality of wireless-enabled computerized client devices being utilized as said ad hoc access point at a time;

receive, by said one or more computer program applications, said link data of each of said plurality of wireless-enabled computerized client devices; and evaluate said link data to determine an optimized configuration for said premises of said user, said determination of said optimized configuration based at least in part on one or more effects of one or more features of said premises on signal frequencies of said plurality of wireless-enabled computerized client devices."

Should read:

-- 1. A computerized network apparatus configured to determine a desired installation configuration within a premises of a user, said computerized network apparatus comprising:

a first interface in data communication with a network;

a storage apparatus; and a processor apparatus configured to execute at least one computer program, said at least one computer program comprising a plurality of instructions which are configured to, when executed by said processor apparatus:

receive, via a message generated by one or more computer program applications operative to run on at least one of a plurality of wireless-enabled computerized client devices of said user, data representative of a request for services;

cause, by said one or more computer program applications, each of said plurality of wireless-enabled computerized client devices to act as an ad hoc access point, wherein said plurality of wireless-enabled computerized client devices are each configured to perform the steps of:

exchanging signals between one another, in an iterative fashion; and collecting link data relating to one or more radio frequency characteristics at each of a plurality of locations in said user's premises where said plurality of wireless-enabled computerized client devices are disposed, said iterative fashion comprising only one of said plurality of wireless-enabled computerized client devices being utilized as said ad hoc access point at a time;

receive said link data of each of said plurality of wireless-enabled computerized client devices; and evaluate said link data to determine an optimized configuration for said premises of said user, said determination of said optimized configuration based at least in part on one or more effects of one or more features of said premises on signal frequencies of said plurality of wireless-enabled computerized client devices. --